US009111526B2

(12) United States Patent
Visser et al.

(10) Patent No.: US 9,111,526 B2
(45) Date of Patent: Aug. 18, 2015

(54) SYSTEMS, METHOD, APPARATUS, AND COMPUTER-READABLE MEDIA FOR DECOMPOSITION OF A MULTICHANNEL MUSIC SIGNAL

(75) Inventors: Erik Visser, San Diego, CA (US); Lae-Hoon Kim, San Diego, CA (US); Jongwon Shin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 13/280,309

(22) Filed: Oct. 24, 2011

(65) Prior Publication Data

US 2012/0128165 A1 May 24, 2012

Related U.S. Application Data

(60) Provisional application No. 61/406,561, filed on Oct. 25, 2010.

(51) Int. Cl.

| | |
|---|---|
| ***H04R 29/00*** | (2006.01) |
| ***H04R 3/00*** | (2006.01) |
| ***G06F 17/00*** | (2006.01) |
| ***G10L 19/008*** | (2013.01) |
| ***G10L 21/0272*** | (2013.01) |
| *G10L 19/02* | (2013.01) |

(52) U.S. Cl.
CPC ........... *G10L 19/008* (2013.01); *G10L 21/0272* (2013.01); *G10L 19/0204* (2013.01)

(58) Field of Classification Search
CPC .......... H04R 1/20; H04R 1/32; G10L 19/008; G10L 21/0272; G10L 19/0204
USPC ........................ 381/56, 92, 94.4, 122; 700/94
See application file for complete search history.

(56) References Cited

U.S. PATENT DOCUMENTS 7,464,029 B2 12/2008 Visser et al.
7,492,908 B2 2/2009 Griesinger (Continued)

FOREIGN PATENT DOCUMENTS

CN 101086846 A 12/2007
JP 2004325127 A 11/2004

(Continued)

OTHER PUBLICATIONS

Vincent, E. et al "Blind Audio Source Separation." Centre for Digital Music. Technical Report C4DM-TR-05-01. Nov. 24, 2005. pp. 1-26.

(Continued)

*Primary Examiner* — Vivian Chin
*Assistant Examiner* — Douglas Suthers
(74) *Attorney, Agent, or Firm* — Austin Rapp & Hardman

(57) ABSTRACT

A method of decomposing a multichannel audio signal is described. The method includes, for each of a plurality of frequency components of a segment in time of the multichannel audio signal, calculating a corresponding indication of a direction of arrival. The method also includes, based on the calculated direction indications, selecting a subset of the plurality of frequency components. The method further includes, based on the selected subset and on a plurality of basis functions, calculating a vector of activation coefficients. Each activation coefficient of the vector corresponds to a different basis function of the plurality of basis functions.

34 Claims, 42 Drawing Sheets

(56) References Cited

U.S. PATENT DOCUMENTS

| | | | |
|---|---|---|---|
| 7,711,127 | B2 | 5/2010 | Suzuki et al. |
| 2004/0204924 | A1 | 10/2004 | Beadle et al. |
| 2006/0277035 | A1 | 12/2006 | Hiroe et al. |
| 2008/0040101 | A1 | 2/2008 | Hayakawa |
| 2009/0116652 | A1 | 5/2009 | Kirkeby et al. |
| 2009/0299742 | A1 | 12/2009 | Toman et al. |

FOREIGN PATENT DOCUMENTS

| | | | |
|---|---|---|---|
| JP | 2008145610 | A | 6/2008 |
| JP | 2010161735 | A | 7/2010 |
| JP | 2010193323 | A | 9/2010 |
| WO | WO-2007014136 | | 2/2007 |
| WO | WO-2010005050 | A1 | 1/2010 |
| WO | WO-2010048620 | A1 | 4/2010 |

OTHER PUBLICATIONS

Burred J., J., "Supervised Musical Source Separation from Mono and Stereo Mixtures based on Sinusoidal Modeling", Jan. 1, 2008, pp. 1-25, XP55014917, Retrieved from the Internet: URL: http://www.jjburred.com/research/pdf/burred_talk08_web.pdf [retrieved on Dec. 15, 2011] pp. 14, 15 pp. 19-22.

International Search Report and Written Opinion—PCT/US2011/057723—ISA/EPO—Dec. 29, 2011.

Ozerov A., et al., "A General Modular Framework for Audio Source Separation", Sep. 27, 2010, Latent Variable Analysis and Signal Separation, Springer Berlin Heidelberg, Berlin, Heidelberg, pp. 33-40, XP019153406, ISBN: 978-3-642-15994-7, Sections 2,3.

| Piano-flute Test Case | SIR (p/f) dB | SAR(p/f) dB | SDR(p/f) dB |
|---|---|---|---|
| 1. Different octave same timbre | 31.73/ 44.67 | 8.12/ 9.56 | 8.09/ 9.56 |
| 2. Same octave same timbre | 19.49/ 35.73 | 7.89/ 7.23 | 7.56/ 7.22 |
| 3. Different octave different timbre | 26.97/ 24.12 | 3.58/ 6.13 | 3.55/ 6.05 |
| 4. Same octave different timbre | 21.67/ 3.71 | 6.17/ 0.43 | 6.02/ -2.34 |

FIG. 31

SYSTEMS, METHOD, APPARATUS, AND COMPUTER-READABLE MEDIA FOR DECOMPOSITION OF A MULTICHANNEL MUSIC SIGNAL

CLAIM OF PRIORITY UNDER 35 U.S.C. §119

The present application for patent claims priority to Provisional Application No. 61/406,561, entitled "MULTI-MICROPHONE SPARSITY-BASED MUSIC SCENE ANALYSIS," filed Oct. 25, 2010, and assigned to the assignee hereof.

BACKGROUND

1. Field

This disclosure relates to audio signal processing.

2. Background

Many music applications on portable devices (e.g., smartphones, netbooks, laptops, tablet computers) or video game consoles are available for single-user cases. In these cases, the user of the device hums a melody, sings a song, or plays an instrument while the device records the resulting audio signal. The recorded signal may then be analyzed by the application for its pitch/note contour, and the user can select processing operations, such as correcting or otherwise altering the contour, upmixing the signal with different pitches or instrument timbres, etc. Examples of such applications include the QUSIC application (QUALCOMM Incorporated, San Diego, Calif.); video games such as Guitar Hero and Rock Band (Harmonix Music Systems, Cambridge, Mass.); and karaoke, one-man-band, and other recording applications.

Many video games (e.g., Guitar Hero, Rock Band) and concert music scenes may involve multiple instruments and vocalists playing at the same time. Current commercial game and music production systems require these scenarios to be played sequentially or with closely positioned microphones to be able to analyze, post-process and upmix them separately. These constraints may limit the ability to control interference and/or to record spatial effects in the case of music production and may result in a limited user experience in the case of video games.

SUMMARY

A method of decomposing an audio signal according to a general configuration includes calculating, for each of a plurality of frequency components of a segment in time of the multichannel audio signal, a corresponding indication of a direction of arrival. This method also includes selecting a subset of the plurality of frequency components, based on the calculated direction indications. This method also includes calculating a vector of activation coefficients, based on the selected subset and on a plurality of basis functions. In this method, each activation coefficient of the vector corresponds to a different basis function of the plurality of basis functions. Computer-readable storage media (e.g., non-transitory media) having tangible features that cause a machine reading the features to perform such a method are also disclosed.

An apparatus for decomposing an audio signal according to a general configuration includes means for calculating, for each of a plurality of frequency components of a segment in time of the multichannel audio signal, a corresponding indication of a direction of arrival; means for selecting a subset of the plurality of frequency components, based on the calculated direction indications; and means for calculating a vector of activation coefficients, based on the selected subset and on a plurality of basis functions. In this apparatus, each activation coefficient of the vector corresponds to a different basis function of the plurality of basis functions.

An apparatus for decomposing an audio signal according to another general configuration includes a direction estimator configured to calculate, for each of a plurality of frequency components of a segment in time of the multichannel audio signal, a corresponding indication of a direction of arrival; a filter configured to select a subset of the plurality of frequency components, based on the calculated direction indications; and a coefficient vector calculator configured to calculate a vector of activation coefficients, based on the selected subset and on a plurality of basis functions. In this apparatus, each activation coefficient of the vector corresponds to a different basis function of the plurality of basis functions.

BRIEF DESCRIPTION OF THE DRAWINGS

FIG. 31 shows a table.

DETAILED DESCRIPTION

Figure 1A:
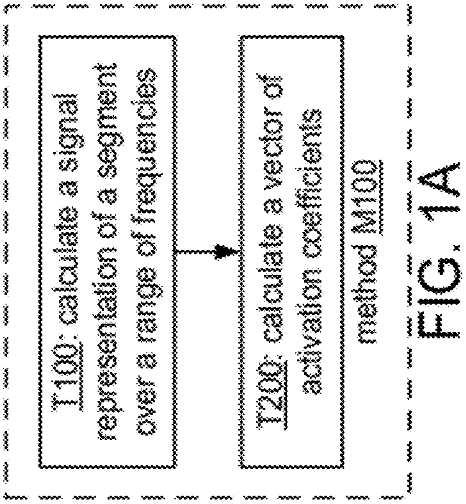
FIG. 1A shows a flowchart of a method M100 according to a general configuration.

Decomposition of an audio signal using a basis function inventory and a sparse recovery technique is disclosed, wherein the basis function inventory includes information relating to the changes in the spectrum of a musical note over the pendency of the note. Such decomposition may be used to support analysis, encoding, reproduction, and/or synthesis of the signal. Examples of quantitative analyses of audio signals that include mixtures of sounds from harmonic (i.e., non-percussive) and percussive instruments are shown herein.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases (e.g., base two) are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, the term "plurality" is used herein to indicate an integer quantity that is greater than one.

A method as described herein may be configured to process the captured signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the signal is divided into a series of nonoverlapping segments or "frames", each having a length of ten milliseconds. A segment as processed by such a method may also be a segment (i.e., a "subframe") of a larger segment as processed by a different operation, or vice versa.

It may be desirable to decompose music scenes to extract individual note/pitch profiles from a mixture of two or more instrument and/or vocal signals. Potential use cases include taping concert/video game scenes with multiple microphones, decomposing musical instruments and vocals with spatial/sparse recovery processing, extracting pitch/note profiles, partially or completely up-mixing individual sources with corrected pitch/note profiles. Such operations may be used to extend the capabilities of music applications (e.g., Qualcomm's QUSIC application, video games such as Rock Band or Guitar Hero) to multi-player/singer scenarios.

It may be desirable to enable a music application to process a scenario in which more than one vocalist is active and/or multiple instruments are played at the same time (e.g., as shown in FIG. A2/0). Such capability may be desirable to support a realistic music-taping scenario (multi-pitch scene). Although a user may want the ability to edit and resynthesize each source separately, producing the sound track may entail recording the sources at the same time.

This disclosure describes methods that may be used to enable a use case for a music application in which multiple sources may be active at the same time. Such a method may be configured to analyze an audio mixture signal using basis-function inventory-based sparse recovery (e.g., sparse decomposition) techniques.

It may be desirable to decompose mixture signal spectra into source components by finding the sparsest vector of activation coefficients (e.g., using efficient sparse recovery algorithms) for a set of basis functions. The activation coefficient vector may be used (e.g., with the set of basis functions) to reconstruct the mixture signal or to reconstruct a selected part (e.g., from one or more selected instruments) of the mixture signal. It may also be desirable to post-process the sparse coefficient vector (e.g., according to magnitude and time support).

FIG. 1A shows a flowchart for a method M100 of decomposing an audio signal according to a general configuration. Method M100 includes a task T100 that calculates, based on information from a frame of the audio signal, a corresponding signal representation over a range of frequencies. Method M100 also includes a task T200 that calculates a vector of activation coefficients, based on the signal representation calculated by task T100 and on a plurality of basis functions, in which each of the activation coefficients corresponds to a different one of the plurality of basis functions.

Task T100 may be implemented to calculate the signal representation as a frequency-domain vector. Each element of such a vector may indicate the energy of a corresponding one of a set of subbands, which may be obtained according to a mel or Bark scale. However, such a vector is typically calculated using a discrete Fourier transform (DFT), such as a fast Fourier transform (FFT), or a short-time Fourier transform (STFT). Such a vector may have a length of, for example, 64, 128, 256, 512, or 1024 bins. In one example, the audio signal has a sampling rate of eight kHz, and the 0-4 kHz band is represented by a frequency-domain vector of 256 bins for each frame of length 32 milliseconds. In another example, the signal representation is calculated using a modified discrete cosine transform (MDCT) over overlapping segments of the audio signal.

In a further example, task T100 is implemented to calculate the signal representation as a vector of cepstral coefficients (e.g., mel-frequency cepstral coefficients or MFCCs) that represents the short-term power spectrum of the frame. In this case, task T100 may be implemented to calculate such a vector by applying a mel-scale filter bank to magnitude of a DFT frequency-domain vector of the frame, taking the logarithm of the filter outputs, and taking a DCT of the logarithmic values. Such a procedure is described, for example, in the Aurora standard described in ETSI document ES 201 108, entitled "STQ: DSR—Front-end feature extraction algorithm; compression algorithm" (European Telecommunications Standards Institute, 2000).

Musical instruments typically have well-defined timbres. The timbre of an instrument may be described by its spectral envelope (e.g., the distribution of energy over a range of frequencies), such that a range of timbres of different musical instruments may be modeled using an inventory of basis functions that encode the spectral envelopes of the individual instruments.

Each basis function comprises a corresponding signal representation over a range of frequencies. It may be desirable for each signal representation to have the same form as the signal representation calculated by task T100. For example, each basis function may be a frequency-domain vector of length 64, 128, 256, 512, or 1024 bins. Alternatively, each basis function may be a cepstral-domain vector, such as a vector of MFCCs. In a further example, each basis function is a wavelet-domain vector.

The basis function inventory A may include a set $A_n$ of basis functions for each instrument n (e.g., piano, flute, guitar, drums, etc.). For example, the timbre of an instrument is generally pitch-dependent, such that the set $A_n$ of basis functions for each instrument n will typically include at least one basis function for each pitch over some desired pitch range, which may vary from one instrument to another. A set of basis functions that corresponds to an instrument tuned to the chromatic scale, for example, may include a different basis function for each of the twelve pitches per octave. The set of basis functions for a piano may include a different basis function for each key of the piano, for a total of eighty-eight basis functions. In another example, the set of basis functions for each instrument includes a different basis function for each pitch in a desired pitch range, such as five octaves (e.g., 56 pitches) or six octaves (e.g., 67 pitches). These sets $A_n$ of basis functions may be disjoint, or two or more sets may share one or more basis functions.

Figure 6:
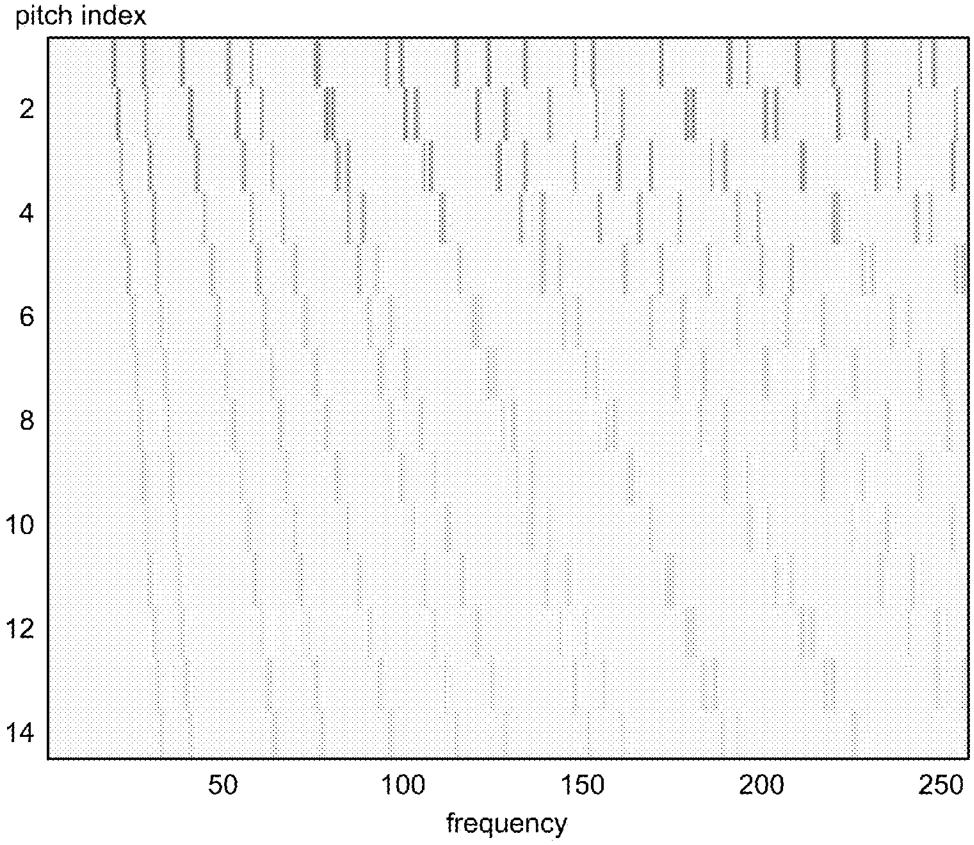
FIG. 6 shows a second example of a basis function inventory.
Figure 7:
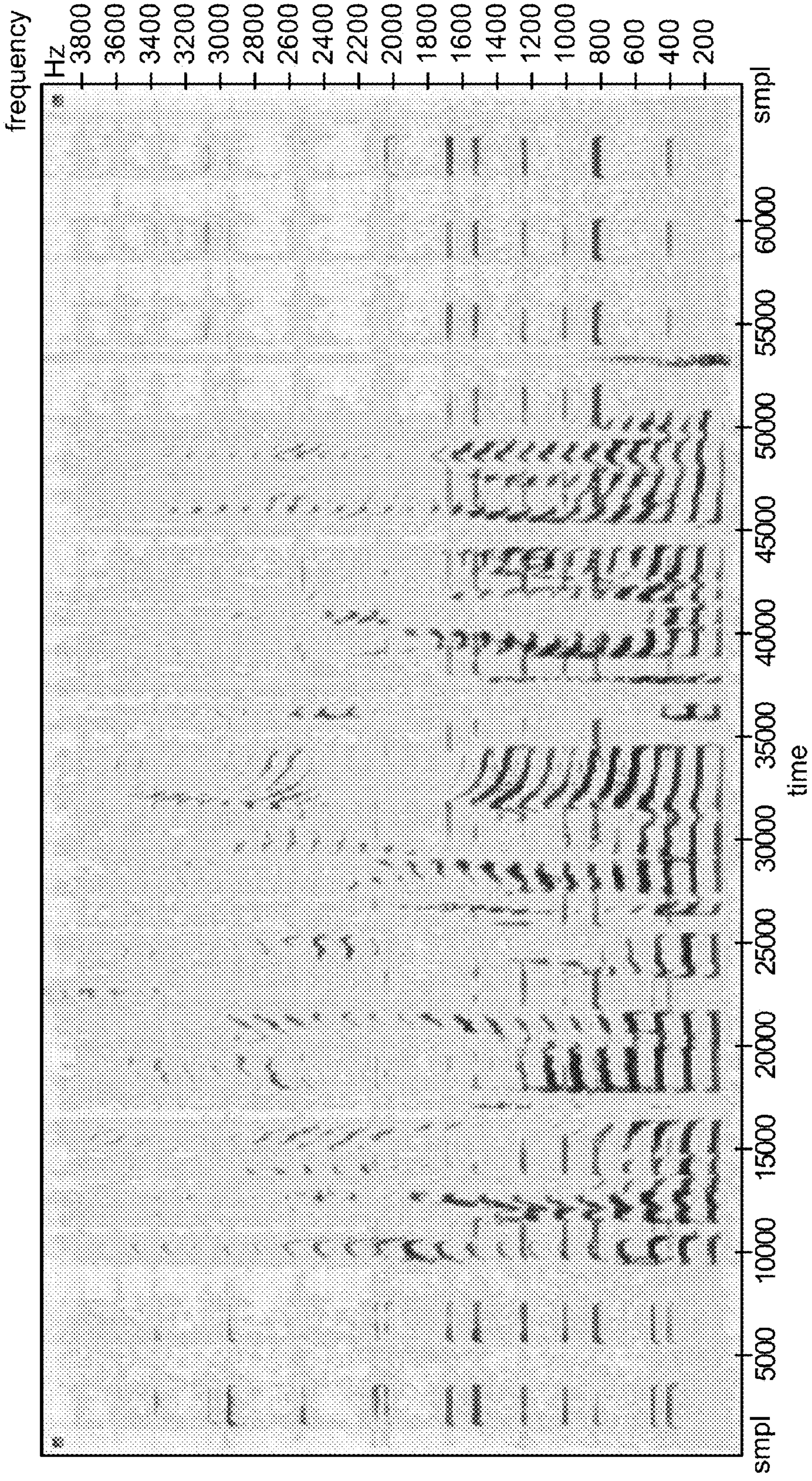
FIG. 7 shows a spectrogram of speech with a harmonic honk.
Figure 8:
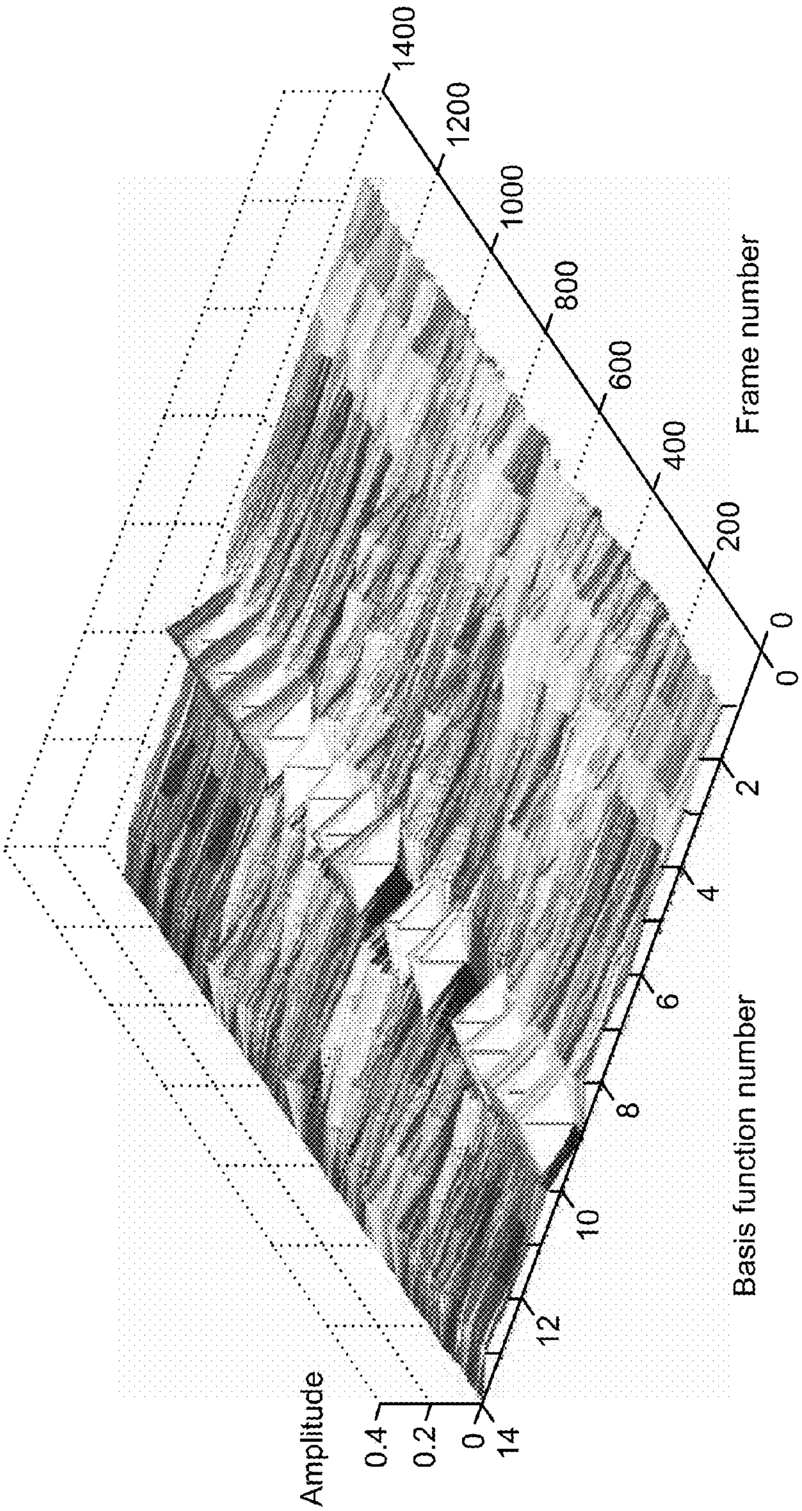
FIG. 8 shows a sparse representation of the spectrogram of FIG. 7 in the inventory of FIG. 6.

FIG. 6 shows an example of a plot (pitch index vs. frequency) for a set of fourteen basis functions for a particular harmonic instrument, in which each basis function of the set encodes a timbre of the instrument at a different corresponding pitch. In the context of a musical signal, a human voice may be considered as a musical instrument, such that the inventory may include a set of basis functions for each of one or more human voice models. FIG. 7 shows a spectrogram of speech with a harmonic honk (frequency in Hz vs. time in samples), and FIG. 8 shows a representation of this signal in the harmonic basis function set shown in FIG. 6. It may be seen that this particular inventory encodes the car-honk component of the signal without encoding the speech component.

The inventory of basis functions may be based on a generic musical instrument pitch database, learned from an ad hoc recorded individual instrument recording, and/or based on separated streams of mixtures (e.g., using a separation scheme such as independent component analysis (ICA), expectation-maximization (EM), etc.).

Figure 9:
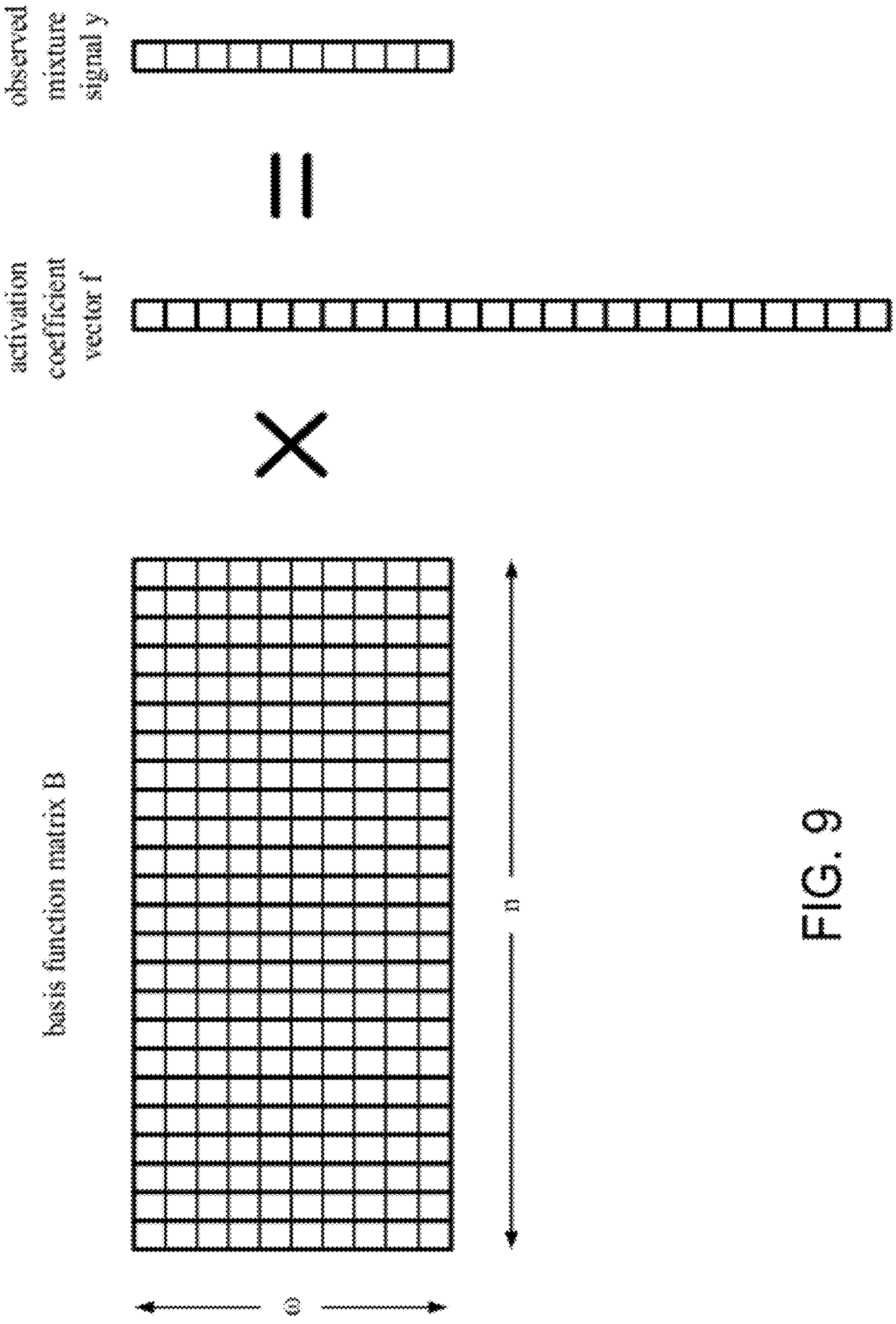
FIG. 9 illustrates a model Bf=y.

Based on the signal representation calculated by task T100 and on a plurality B of basis functions from the inventory A, task T200 calculates a vector of activation coefficients. Each coefficient of this vector corresponds to a different one of the plurality B of basis functions. For example, task T200 may be configured to calculate the vector such that it indicates the most probable model for the signal representation, according to the plurality B of basis functions. FIG. 9 illustrates such a model Bf=y in which the plurality B of basis functions is a matrix such that the columns of B are the individual basis functions, f is a column vector of basis function activation coefficients, and y is a column vector of a frame of the recorded mixture signal (e.g., a five-, ten-, or twenty-millisecond frame, in the form of a spectrogram frequency vector).

Task T200 may be configured to recover the activation coefficient vector for each frame of the audio signal by solving a linear programming problem. Examples of methods that may be used to solve such a problem include nonnegative matrix factorization (NNMF). A single-channel reference method that is based on NNMF may be configured to use expectation-maximization (EM) update rules (e.g., as described below) to compute basis functions and activation coefficients at the same time.

It may be desirable to decompose the audio mixture signal into individual instruments (which may include one or more human voices) by finding the sparsest activation coefficient vector in a known or partially known basis function space. For example, task T200 may be configured to use a set of known instrument basis functions to decompose mixture spectra into source components (e.g., one or more individual instruments) by finding the sparsest activation coefficient vector in the basis function inventory (e.g., using efficient sparse recovery algorithms).

It is known that the minimum L1-norm solution to an underdetermined system of linear equations (i.e., a system having more unknowns than equations) is often also the sparsest solution to that system. Sparse recovery via minimization of the L1-norm may be performed as follows.

We assume that our target vector $f_0$ is a sparse vector of length N having K<N nonzero entries (i.e., is "K-sparse") and that projection matrix (i.e., basis function matrix) A is incoherent (random-like) for a set of size ~K. We observe the signal $y=Af_o$. Then solving $\min_f \|f\|_{l_1}$ subject to Af=y (where $\|f\|_{l_1}$ is defined as $\Sigma_{i=1}{}^n|f_i|$) will recover $f_0$ exactly. Moreover, we can recover $f_0$ from $M \geq K \cdot \log N$ incoherent measurements by solving a tractable program. The number of measurements M is approximately equal to the number of active components.

One approach is to use sparse recovery algorithms from compressive sensing. In one example of compressive sensing (also called "compressed sensing") signal recovery $\Phi x=y$, y is an observed signal vector of length M, x is a sparse vector of length N having K<N nonzero entries (i.e., a "K-sparse model") that is a condensed representation of y, and $\Phi$ is a random projection matrix of size M×N. The random projection $\Phi$ is not full rank, but it is invertible for sparse/compressible signal models with high probability (i.e., it solves an ill-posed inverse problem).

Figure 10:
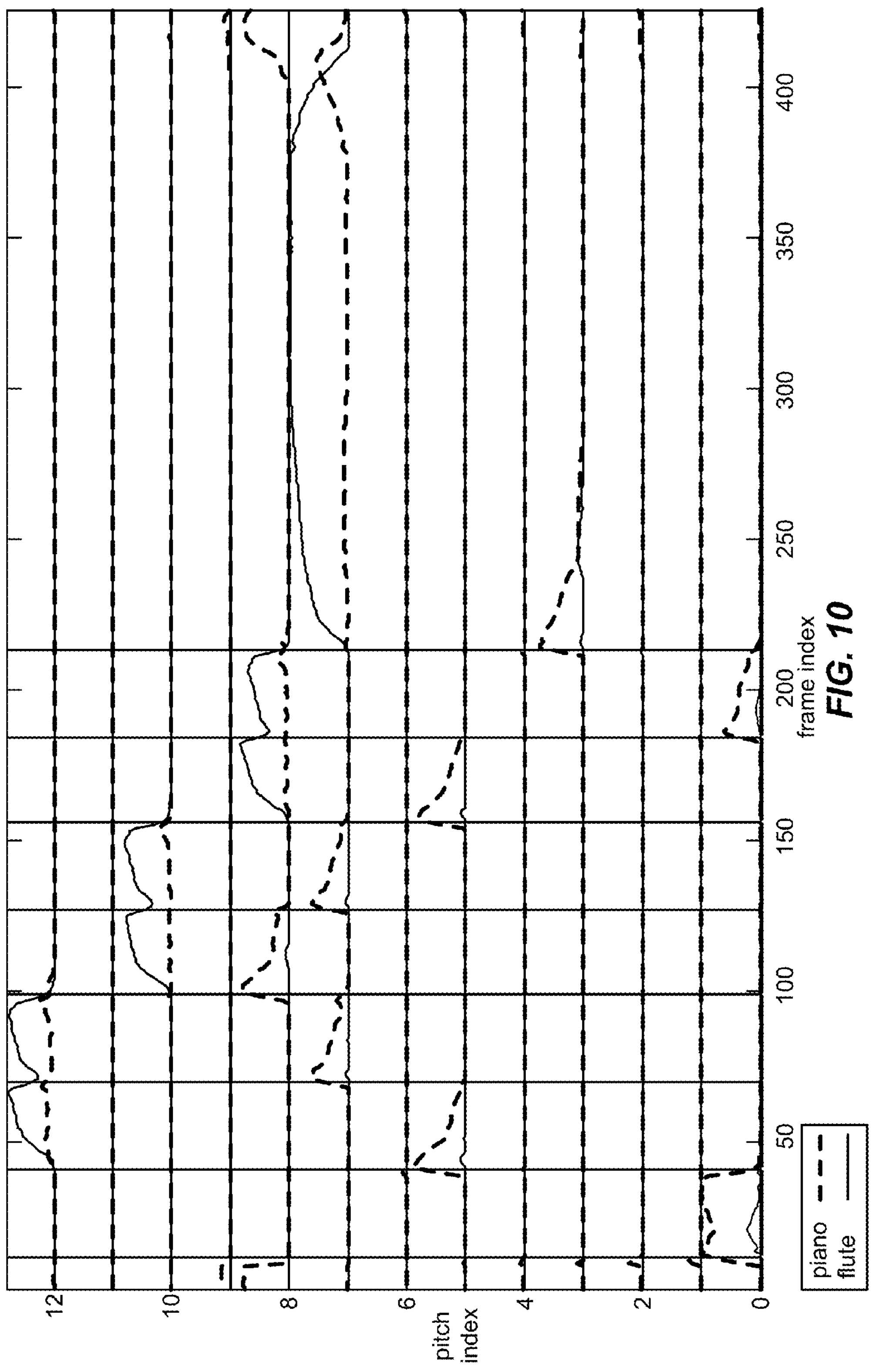
FIG. 10 shows a plot of a separation result produced by produced by method M100.

FIG. 10 shows a plot (pitch index vs. frame index) of a separation result produced by a sparse recovery implementation of method M100. In this case, the input mixture signal includes a piano playing the sequence of notes C5-F5-G5-G#5-G5-F5-C5-D#5, and a flute playing the sequence of notes C6-A#5-G#5-G5. The separated result for the piano is shown in dashed lines (the pitch sequence 0-5-7-8-7-5-0-3), and the separated result for the flute is shown in solid lines (the pitch sequence 12-10-8-7).

The activation coefficient vector f may be considered to include a subvector $f_n$ for each instrument n that includes the activation coefficients for the corresponding basis function set $A_n$. These instrument-specific activation subvectors may be processed independently (e.g., in a post-processing operation). For example, it may be desirable to enforce one or more sparsity constraints (e.g., at least half of the vector elements are zero, the number of nonzero elements in an instrument-specific subvector does not exceed a maximum value, etc.). Processing of the activation coefficient vector may include encoding the index number of each non-zero activation coefficient for each frame, encoding the index and value of each non-zero activation coefficient, or encoding the entire sparse vector. Such information may be used (e.g., at another time and/or location) to reproduce the mixture signal using the indicated active basis functions, or to reproduce only a particular part of the mixture signal (e.g., only the notes played by a particular instrument).

An audio signal produced by a musical instrument may be modeled as a series of events called notes. The sound of a harmonic instrument playing a note may be divided into different regions over time: for example, an onset stage (also called attack), a stationary stage (also called sustain), and an offset stage (also called release). Another description of the temporal envelope of a note (ADSR) includes an additional decay stage between attack and sustain. In this context, the duration of a note may be defined as the interval from the start of the attack stage to the end of the release stage (or to another event that terminates the note, such as the start of another note on the same string). A note is assumed to have a single pitch, although the inventory may also be implemented to model notes having a single attack and multiple pitches (e.g., as produced by a pitch-bending effect, such as vibrato or portamento). Some instruments (e.g., a piano, guitar, or harp) may produce more than one note at a time in an event called a chord.

Notes produced by different instruments may have similar timbres during the sustain stage, such that it may be difficult to identify which instrument is playing during such a period. The timbre of a note may be expected to vary from one stage to another, however. For example, identifying an active instrument may be easier during an attack or release stage than during a sustain stage.

Figure 12:
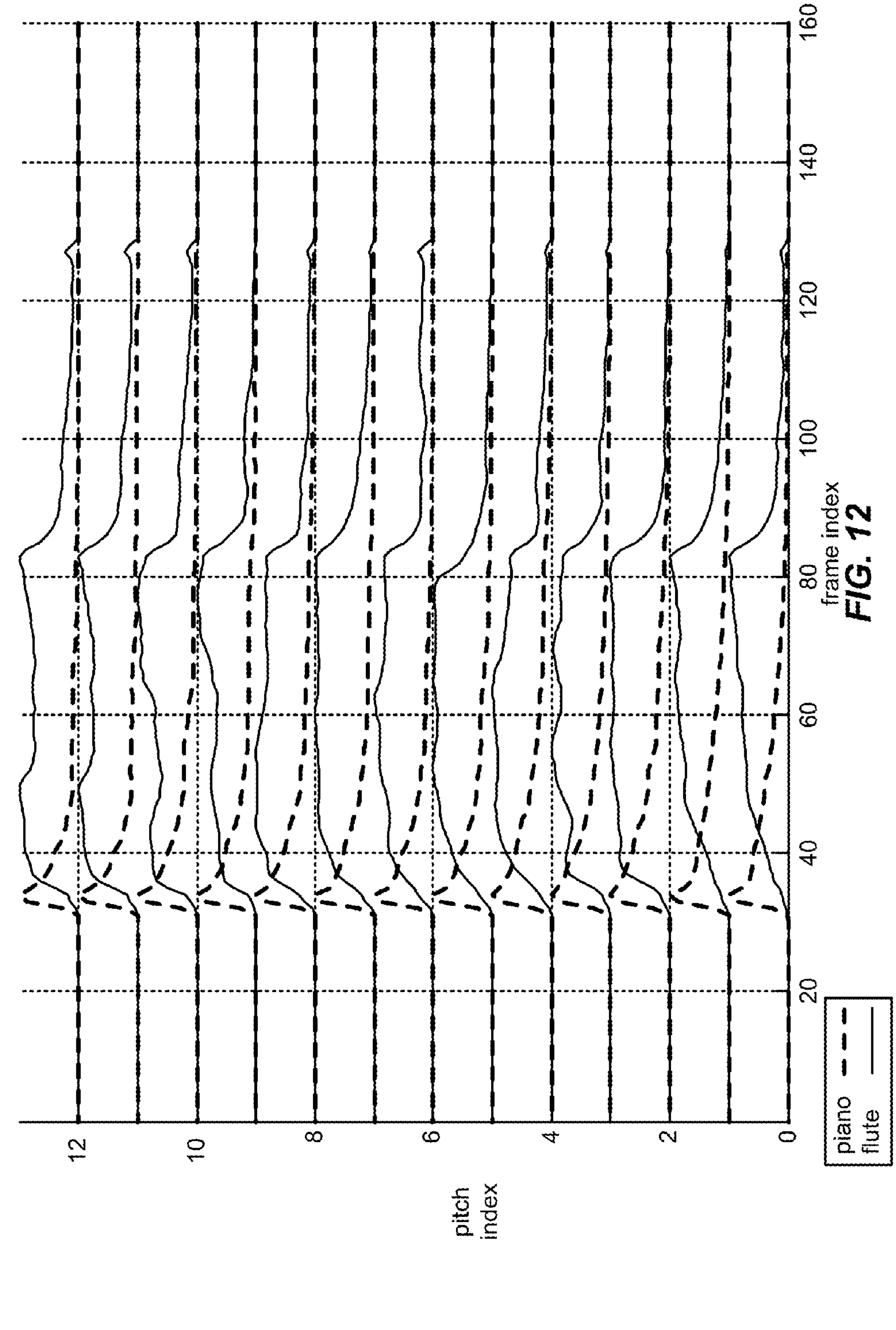
FIG. 12 shows a plot of time-domain evolutions of basis functions during the pendency of a note for a piano and for a flute.

FIG. 12 shows a plot (pitch index vs. time-domain frame index) of the time-domain evolutions of basis functions for the twelve different pitches in the octave C5-C6 for a piano (dashed lines) and for a flute (solid lines). It may be seen, for example, that the relation between the attack and sustain stages for a piano basis function is significantly different than the relation between the attack and sustain stages for a flute basis function.

To increase the likelihood that the activation coefficient vector will indicate an appropriate basis function, it may be desirable to maximize differences between the basis functions. For example, it may be desirable for a basis function to include information relating to changes in the spectrum of a note over time.

It may be desirable to select a basis function based on a change in timbre over time. For example, it may be desirable to encode information relating to such time-domain evolution of the timbre of a note into the basis function inventory. For example, the set $A_n$ of basis functions for a particular instrument n may include two or more corresponding signal representations at each pitch, such that each of these signal representations corresponds to a different time in the evolution of the note (e.g., one for attack stage, one for sustain stage, and one for release stage). These basis functions may be extracted from corresponding frames of a recording of the instrument playing the note.

Figure 1B:
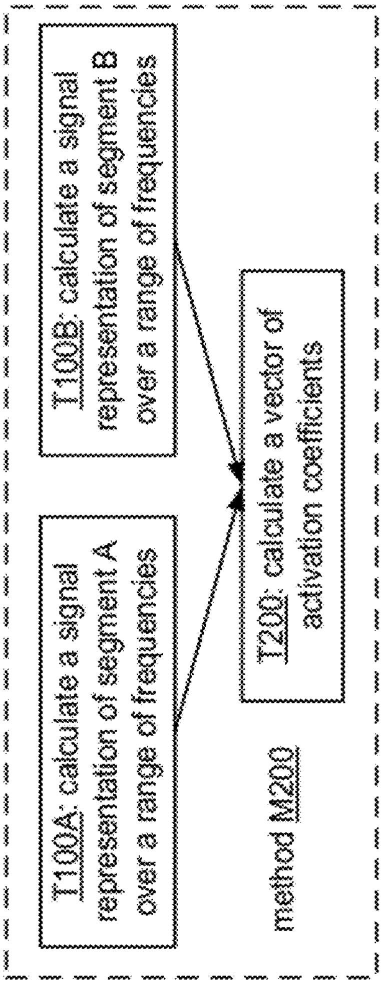
FIG. 1B shows a flowchart of an implementation M200 of method M100.
Figure 1C:
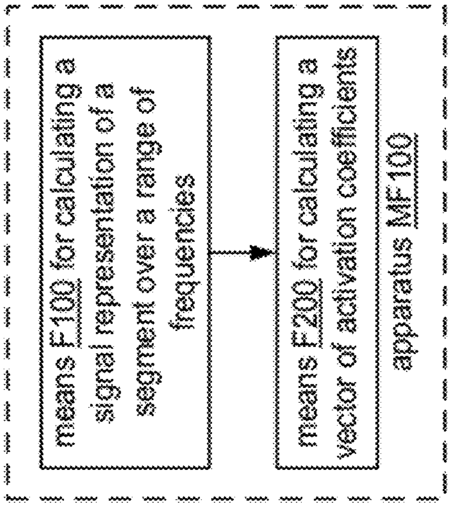
FIG. 1C shows a block diagram for an apparatus MF100 for decomposing an audio signal according to a general configuration.

FIG. 1C shows a block diagram for an apparatus MF100 for decomposing an audio signal according to a general configuration. Apparatus MF100 includes means F100 for calculating, based on information from a frame of the audio signal, a corresponding signal representation over a range of frequencies (e.g., as described herein with reference to task T100). Apparatus MF100 also includes means F200 for calculating a vector of activation coefficients, based on the signal representation calculated by means F100 and on a plurality of basis functions, in which each of the activation coefficients corresponds to a different one of the plurality of basis functions (e.g., as described herein with reference to task T200).

Figure 1D:
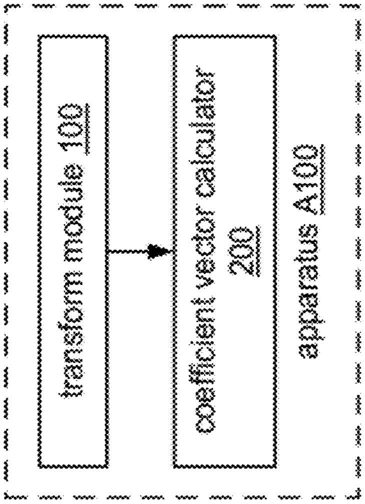
FIG. 1D shows a block diagram for an apparatus A100 for decomposing an audio signal according to another general configuration.

FIG. 1D shows a block diagram for an apparatus A100 for decomposing an audio signal according to another general configuration that includes transform module 100 and coefficient vector calculator 200. Transform module 100 is configured to calculate, based on information from a frame of the audio signal, a corresponding signal representation over a range of frequencies (e.g., as described herein with reference to task T100). Coefficient vector calculator 200 is configured to calculate a vector of activation coefficients, based on the signal representation calculated by transform module 100 and on a plurality of basis functions, in which each of the activation coefficients corresponds to a different one of the plurality of basis functions (e.g., as described herein with reference to task T200).

FIG. 1B shows a flowchart of an implementation M200 of method M100 in which the basis function inventory includes multiple signal representations for each instrument at each pitch. Each of these multiple signal representations describes a plurality of different distributions of energy (e.g., a plurality of different timbres) over the range of frequencies. The inventory may also be configured to include different multiple signal representations for different time-related modalities. In one such example, the inventory includes multiple signal representations for a string being bowed at each pitch and different multiple signal representations for the string being plucked (e.g., pizzicato) at each pitch.

Figure 11:
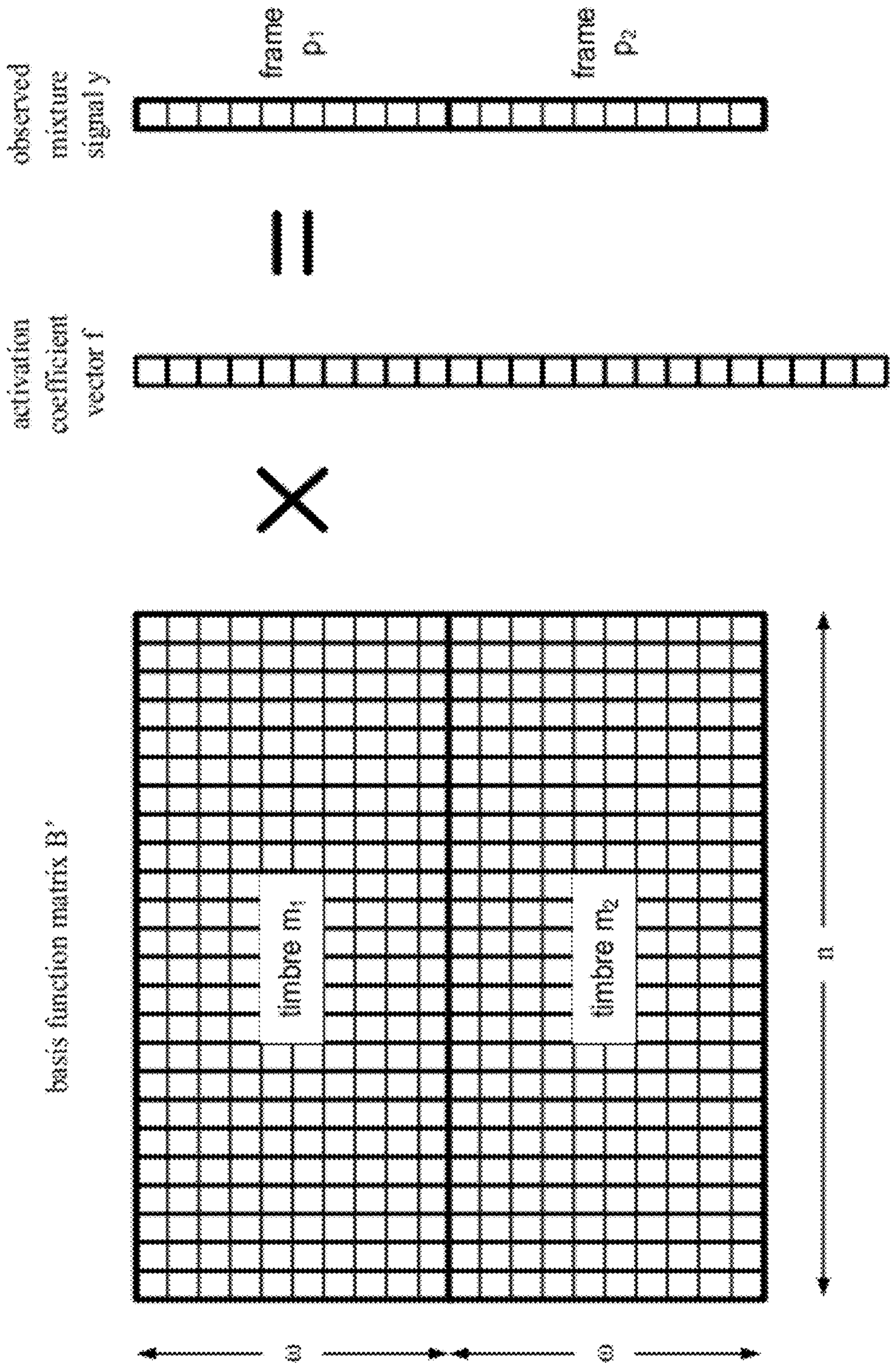
FIG. 11 illustrates a modification B'f=y of the model of FIG. 9.

Method M200 includes multiple instances of task T100 (in this example, tasks T100A and T100B), wherein each instance calculates, based on information from a corresponding different frame of the audio signal, a corresponding signal representation over a range of frequencies. The various signal representations may be concatenated, and likewise each basis function may be a concatenation of multiple signal representations. In this example, task T200 matches the concatenation of mixture frames against the concatenations of the signal representations at each pitch. FIG. 11 shows an example of a modification B'f=y of the model Bf=y of FIG. 55 in which frames p1, p2 of the mixture signal y are concatenated for matching.

The inventory may be constructed such that the multiple signal representations at each pitch are taken from consecutive frames of a training signal. In other implementations, it may be desirable for the multiple signal representations at each pitch to span a larger window in time. For example, it may be desirable for the multiple signal representations at each pitch to include signal representations from at least two among an attack stage, a sustain stage, and a release stage. By including more information regarding the time-domain evolution of the note, the difference between the sets of basis functions for different notes may be increased.

Figure 14:
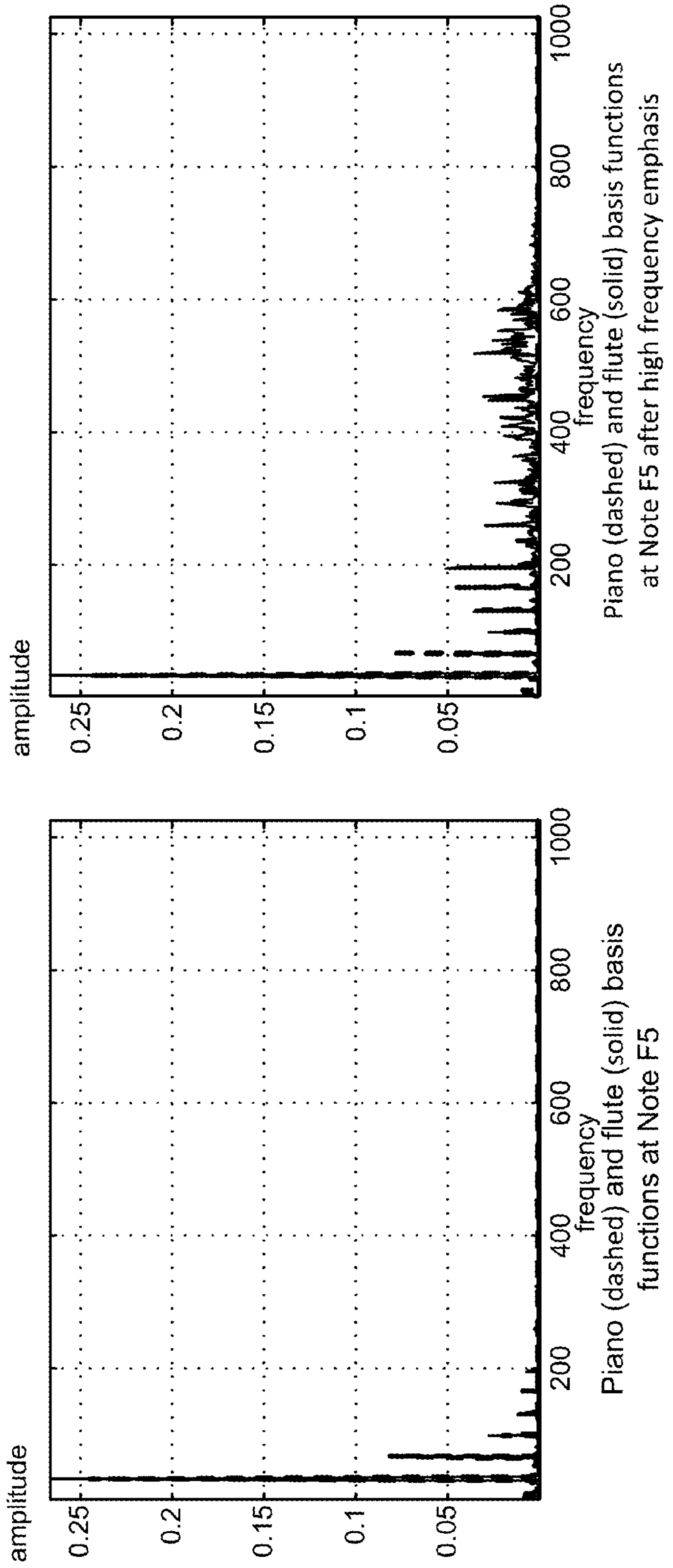
FIG. 14 shows a plot of basis functions for a piano and a flute at note F5 (left) and a plot of pre-emphasized basis functions for a piano and a flute at note F5 (right).

On the left, FIG. 14 shows a plot (amplitude vs. frequency) of a basis function for a piano at note F5 (dashed line) and a basis function for a flute at note F5 (solid line). It may be seen that these basis functions, which indicate the timbres of the instruments at this particular pitch, are very similar Consequently, some degree of mismatching among them may be expected in practice. For a more robust separation result, it may be desirable to maximize the differences among the basis functions of the inventory.

The actual timbre of a flute contains more high-frequency energy than that of a piano, although the basis functions shown in the left plot of FIG. 14 do not encode this information. On the right, FIG. 14 shows another plot (amplitude vs. frequency) of a basis function for a piano at note F5 (dashed line) and a basis function for a flute at note F5 (solid line). In this case, the basis functions are derived from the same source signals as the basis functions in the left plot, except that the high-frequency regions of the source signals have been pre-emphasized. Because the piano source signal contains significantly less high-frequency energy than the flute source signal, the difference between the basis functions shown in the right plot is appreciably greater than the difference between the basis functions shown in the left plot.

Figure 2B:
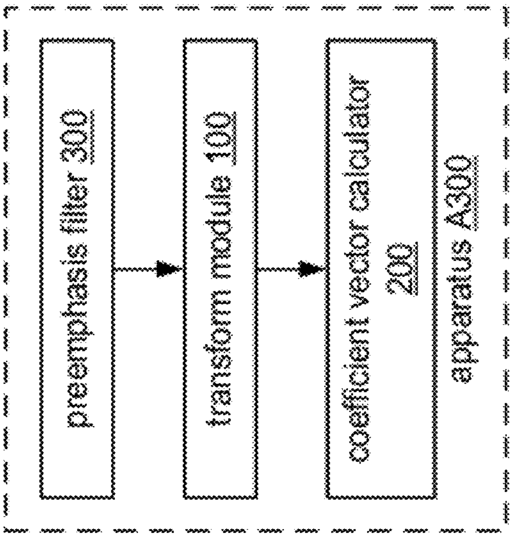
FIG. 2B shows a block diagram of an implementation A300 of apparatus A100.
Figure 2C:
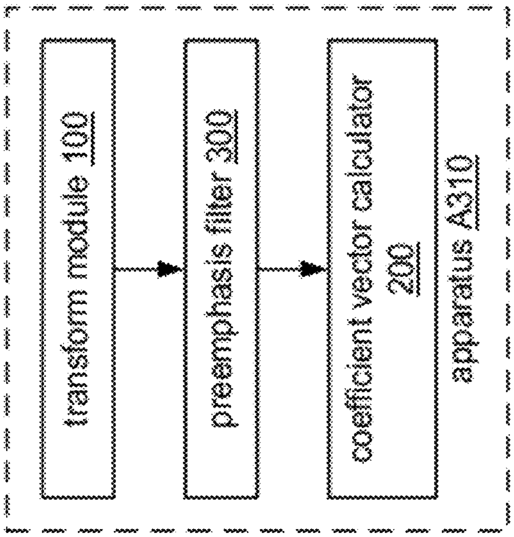
FIG. 2C shows a block diagram of another implementation A310 of apparatus A100.
Figure 2A:
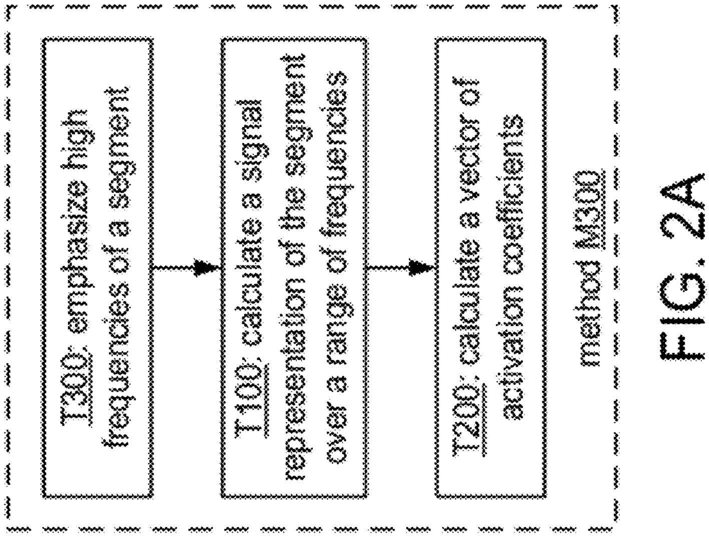
FIG. 2A shows a flowchart of an implementation M300 of method M100.
Figure 3A:
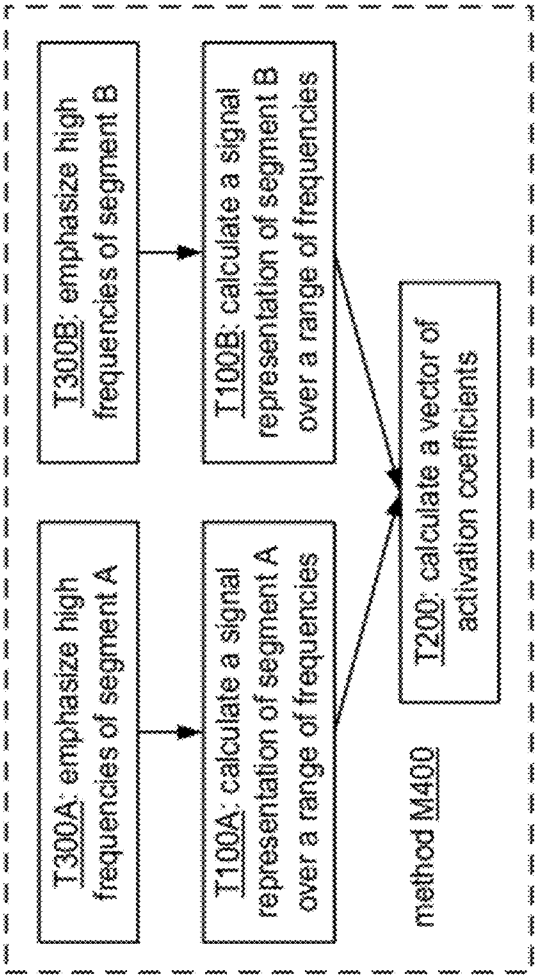
FIG. 3A shows a flowchart of an implementation M400 of method M200.

FIG. 2A shows a flowchart of an implementation M300 of method M100 that includes a task T300 which emphasizes high frequencies of the segment. In this example, task T100 is arranged to calculate the signal representation of the segment after preemphasis. FIG. 3A shows a flowchart of an implementation M400 of method M200 that includes multiple instances T300A, T300B of task T300. In one example, pre-emphasis task T300 increases the ratio of energy above 200 Hz to total energy.

Figure 13:
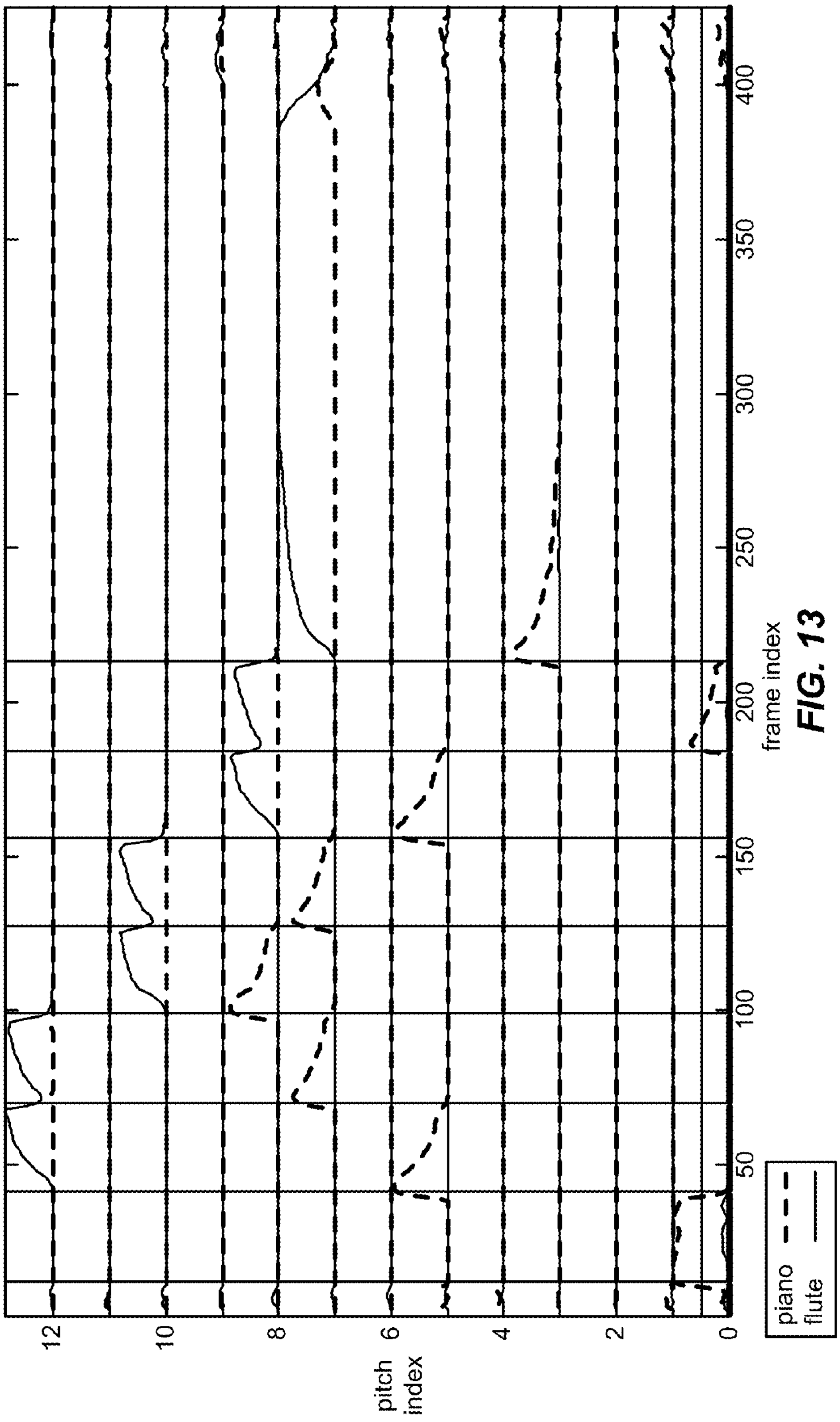
FIG. 13 shows a plot of a separation result produced by method M400.

FIG. 2B shows a block diagram of an implementation A300 of apparatus A100 that includes a preemphasis filter 300 (e.g., a highpass filter, such as a first-order highpass filter) that is arranged to perform high-frequency emphasis on the audio signal upstream of transform module 100. FIG. 2C shows a block diagram of another implementation A310 of apparatus A100 in which preemphasis filter 300 is arranged to perform high-frequency preemphasis on the transform coefficients. In these cases, it may also be desirable to perform high-frequency pre-emphasis (e.g., highpass filtering) on the plurality B of basis functions. FIG. 13 shows a plot (pitch index vs. frame index) of a separation result produced by method M300 on the same input mixture signal as the separation result of FIG. 10.

A musical note may include coloration effects, such as vibrato and/or tremolo. Vibrato is a frequency modulation, with a modulation rate that is typically in a range of from four or five to seven, eight, ten, or twelve Hertz. A pitch change due to vibrato may vary between 0.6 to two semitones for singers, and is generally less than +/−0.5 semitone for wind and string instruments (e.g., between 0.2 and 0.35 semitones for string instruments). Tremolo is an amplitude modulation typically having a similar modulation rate.

It may be difficult to model such effects in the basis function inventory. It may be desirable to detect the presence of such effects. For example, the presence of vibrato may be indicated by a frequency-domain peak in the range of 4-8 Hz. It may also be desirable to record a measure of the level of the detected effect (e.g., as the energy of this peak), as such a characteristic may be used to restore the effect during reproduction. Similar processing may be performed in the time domain for tremolo detection and quantification. Once the effect has been detected and possibly quantified, it may be desirable to remove the modulation by smoothing the frequency over time for vibrato or by smoothing the amplitude over time for tremolo.

Figure 4B:
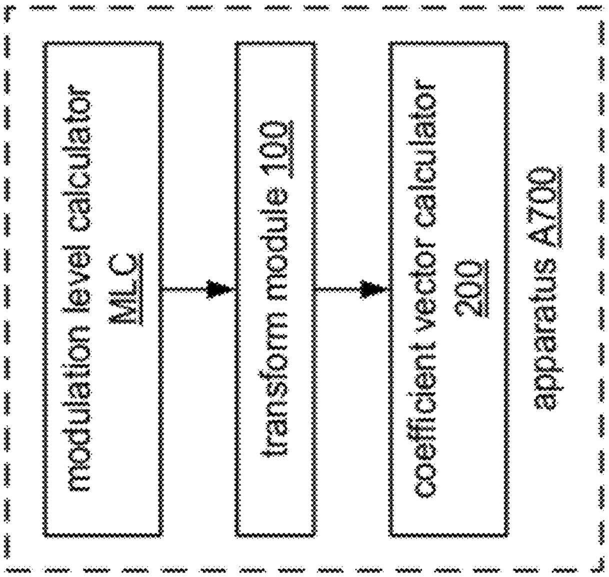
FIG. 4B shows a block diagram of an implementation A700 of apparatus A100.

FIG. 4B shows a block diagram of an implementation A700 of apparatus A100 that includes a modulation level calculator MLC. Calculator MLC is configured to calculate, and possibly to record, a measure of a detected modulation (e.g., an energy of a detected modulation peak in the time or frequency domain) in a segment of the audio signal as described above.

This disclosure describes methods that may be used to enable a use case for a music application in which multiple sources may be active at the same time. In such case, it may be desirable to separate the sources, if possible, before calculating the activation coefficient vector. To achieve this goal, a combination of multi- and single-channel techniques is proposed.

Figure 3B:
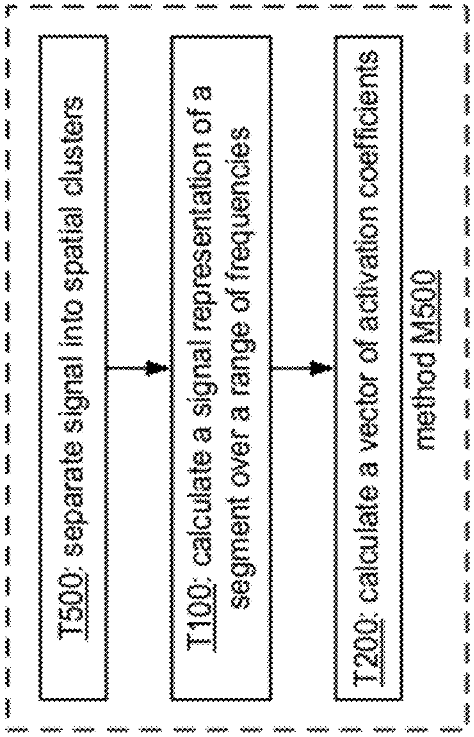
FIG. 3B shows a flowchart of an implementation M500 of method M200.

FIG. 3B shows a flowchart of an implementation M500 of method M100 that includes a task T500 which separates the signal into spatial clusters. Task T500 may be configured to isolate the sources into as many spatial clusters as possible. In one example, task T500 uses multi-microphone processing to separate the recorded acoustic scenario into as many spatial clusters as possible. Such processing may be based on gain differences and/or phase differences between the microphone signals, where such differences may be evaluated across an entire frequency band or at each of a plurality of different frequency subbands or frequency bins.

Figure 16:
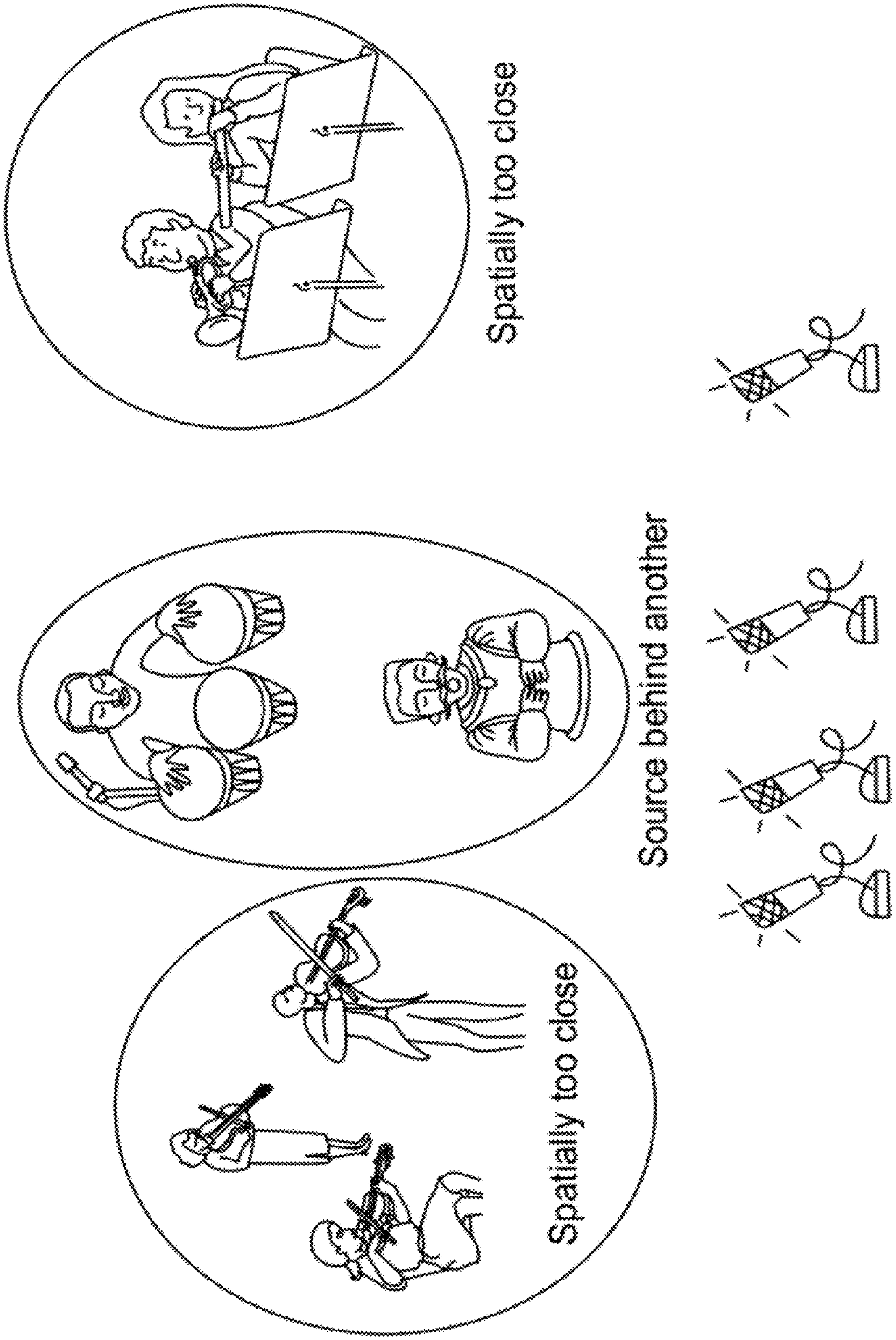
FIG. 16 illustrates a scenario in which sources are located close together and a source is located behind another source.
Figure 17:
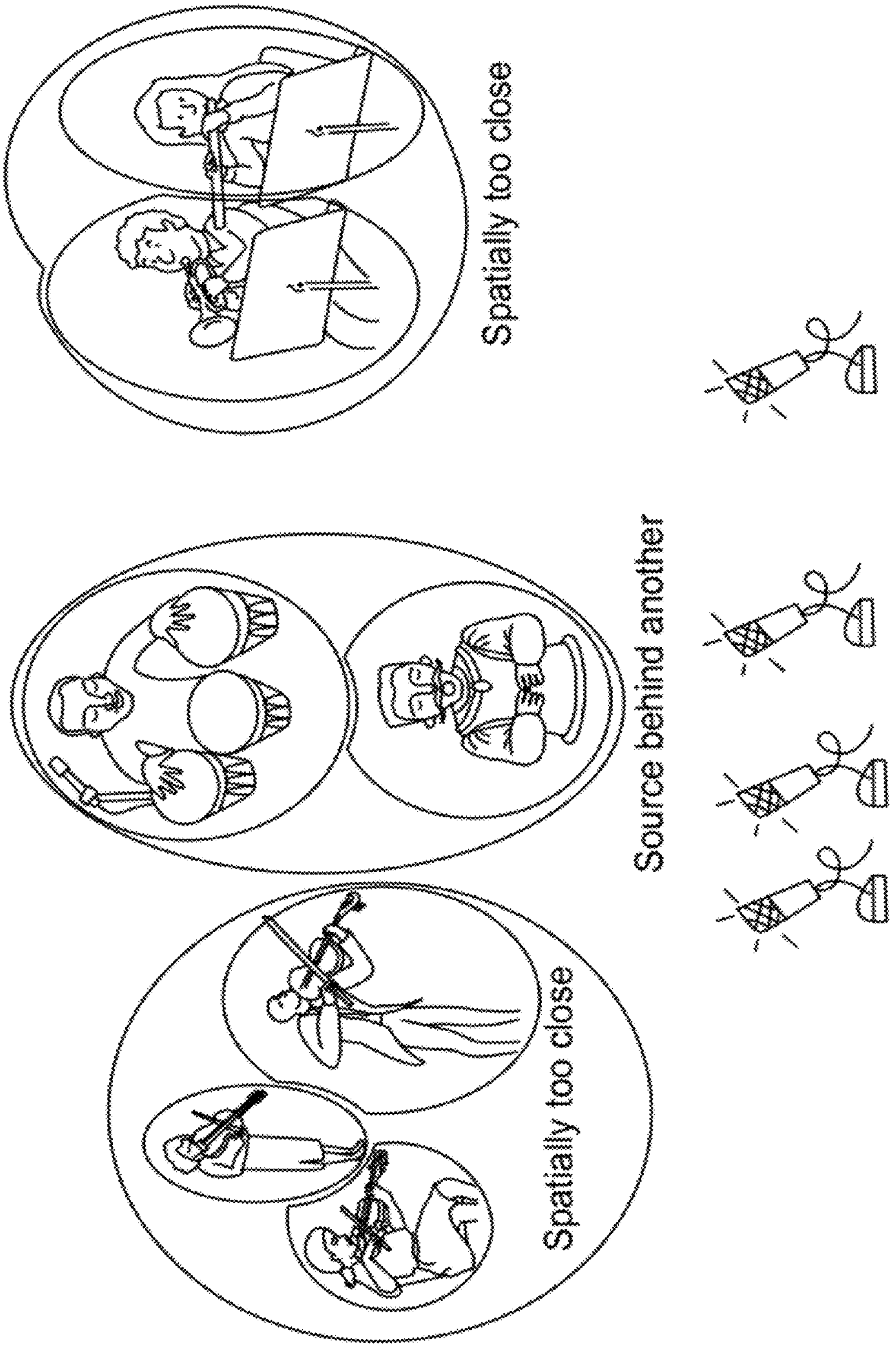
FIG. 17 illustrates a result of analyzing individual spatial clusters.

Spatial separation methods may be insufficient to achieve a desired level of separation. For example, some sources may be too close or otherwise suboptimally arranged with respect to the microphone array (e.g. multiple violinists and/or harmonic instruments may be located in one corner; percussionists are usually located in the back). In a typical music-band scenario, sources may be located close together or even behind other sources (e.g., as shown in FIG. 16), such that using spatial information alone to process a signal captured by an array of microphones that are in the same general direction to the band may fail to discriminate all of the sources from one another. Tasks T100 and T200 analyze the individual spatial clusters using single-channel, basis-function inventory-based sparse recovery (e.g., sparse decomposition) techniques as described herein to separate the individual instruments (e.g., as shown in FIG. 17).

To address multi-player use cases, a handset/netbook/laptop-mounted microphone array with a spatial and sparsity-based signal-processing scheme is proposed. One such approach includes a) using multiple microphones to record a multichannel mixture signal; b) analyzing the time-frequency (T-F) points of the mixture signal in a limited frequency range as to their DOA/TDOA (direction of arrival/time difference of arrival), to identify and extract a set of directionally coherent T-F points; c) using a sparse recovery algorithm to match the extracted, spatially coherent T-F amplitude points to a musical instrument/vocalist basis function inventory in the limited frequency range; d) subtracting the identified spatial basis functions from the original recorded amplitudes in the whole frequency range to obtain a residual signal, and then e) matching the residual signal amplitudes to the basis function inventory.

Figure 15:
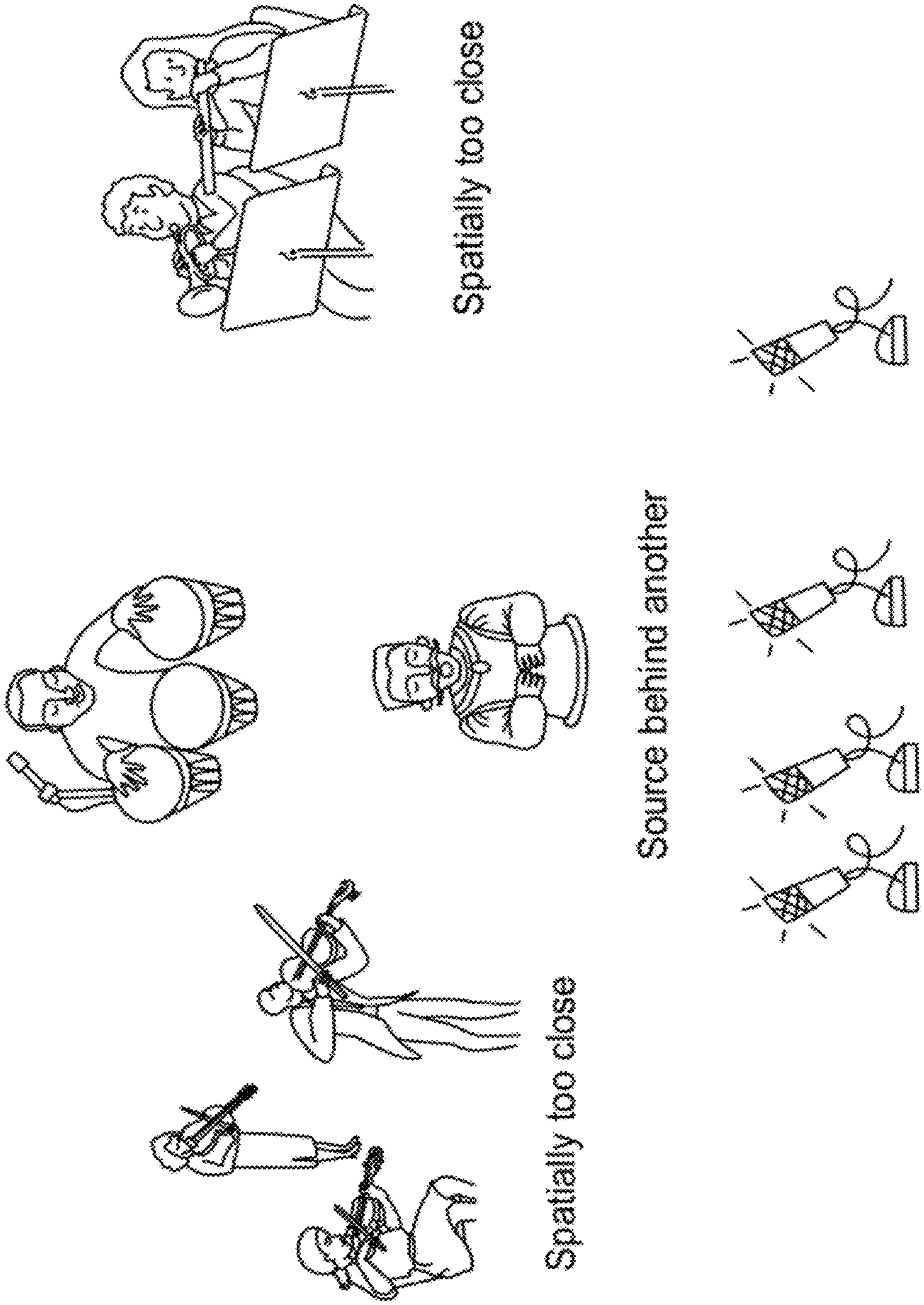
FIG. 15 illustrates a scenario in which multiple sound sources are active.

With an array of two or more microphones, it becomes possible to obtain information regarding the direction of arrival of a particular sound (i.e., the direction of the sound source relative to the array). While it may sometimes be possible to separate signal components from different sound sources based on their directions of arrival, in general spatial separation methods alone may be insufficient to achieve a desired level of separation. For example, some sources may be too close or otherwise suboptimally arranged with respect to the microphone array (e.g. multiple violinists and/or harmonic instruments may be located in one corner; percussionists are usually located in the back). In a typical music-band scenario, sources may be located close together or even behind other sources (e.g., as shown in FIG. 15), such that using spatial information alone to process a signal captured by an array of microphones that are in the same general direction to the band may fail to discriminate all of the sources from one another.

We begin by matching a particular limited frequency range of the observed mixture signal against a basis function inventory, to identify the basis functions that are activated by this range. Based on these identified basis functions, we then subtract corresponding source components from the original mixture signal over the complete frequency range. These subtracted regions are likely to be discontinuous in both time and frequency. It may also be desirable to continue by matching the resulting residual mixture signal to the basis function inventory (e.g., to identify the next most active instrument in the signal, or to identify one or more spatially distributed sources).

Figure 34A:
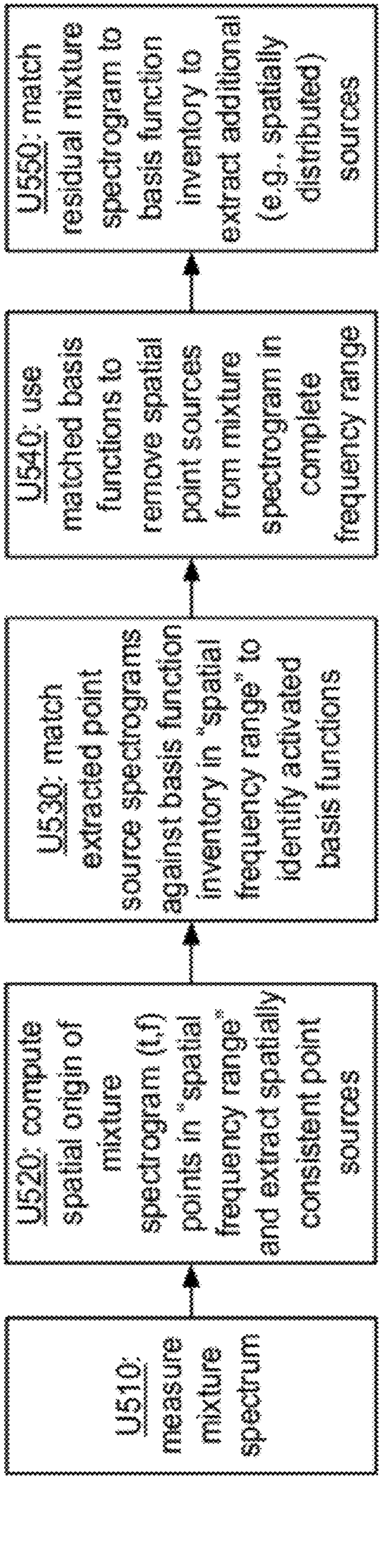
FIG. 34A shows a processing flowchart of a method according to a general configuration.

FIG. 34A shows a processing flowchart of such a method that includes tasks U510, U520, U530, U540, and U550. Task U510 measures the mixture spectrum. Task U520 extracts one or more spatially consistent point sources from the mixture spectrogram (e.g., based on an indication of the direction of arrival of each T-F point). Task U530 matches the extracted source spectrograms against the basis function inventory in the "spatial frequency range" to identify basis functions activated by the "spatial frequency range" of the mixture signal. Task U540 uses the matched basis functions to remove the extracted sources from the mixture spectrogram in the complete frequency range. Task U550 may also be included to match the residual mixture spectrogram to the basis function inventory to extract additional sources.

Figure 35A:
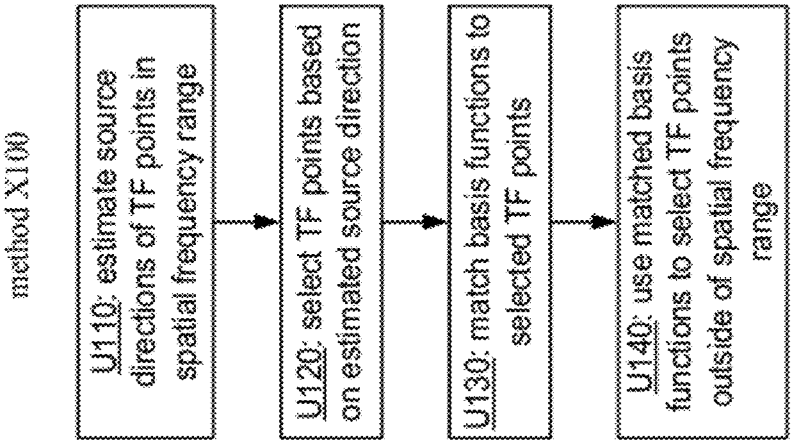
FIG. 35A shows a flowchart of a method X100 according to a general configuration.

FIG. 35A shows a flowchart for another method X100 of processing a multichannel signal according to a general configuration that includes tasks U110, U120, U130, and U140. Task U110 estimates the source direction for each time-frequency (T-F) point of the multichannel signal within a reduced frequency range (also called the "spatial frequency range") of the multichannel signal. The spatial frequency range is related to the spacings among the transducers (e.g., microphones) of the array that was used to capture the multichannel signal. For example, the low end of the spatial frequency range may be determined by the maximum available spacing between microphones of the array, and the high end of the spatial frequency range may be determined by the spacing between adjacent microphones of the array.

Figure 34B:
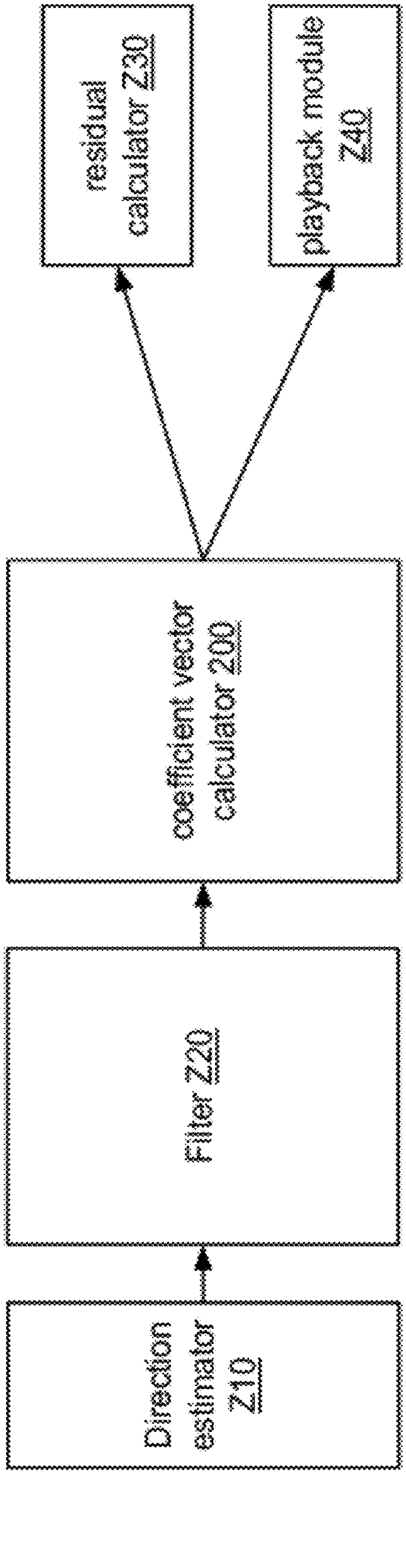
FIG. 34B shows a block diagram of an apparatus A950.

FIG. 34B shows a block diagram of an apparatus A950 according to a general configuration. Apparatus A590 includes a direction estimator Z10 configured to calculate, for each of a plurality of frequency components of a segment in time of the multichannel audio signal, a corresponding indication of a direction of arrival. Apparatus A590 also includes a filter Z20 configured to select a subset of the plurality of frequency components, based on the calculated direction indications, and an instance of coefficient vector calculator 200 configured to calculate a vector of activation coefficients, based on the selected subset and on a plurality of basis functions. In this example, apparatus A590 also includes a residual calculator Z30 configured to produce a residual signal, based on information from the calculated vector, by subtracting at least one among the plurality of basis functions from at least one channel of the multichannel audio signal, and a playback module Z40 that is configured to use each of at least one of the plurality of basis functions, based on information from the calculated vector, to reconstruct a corresponding component of the multichannel signal.

Figure 36:
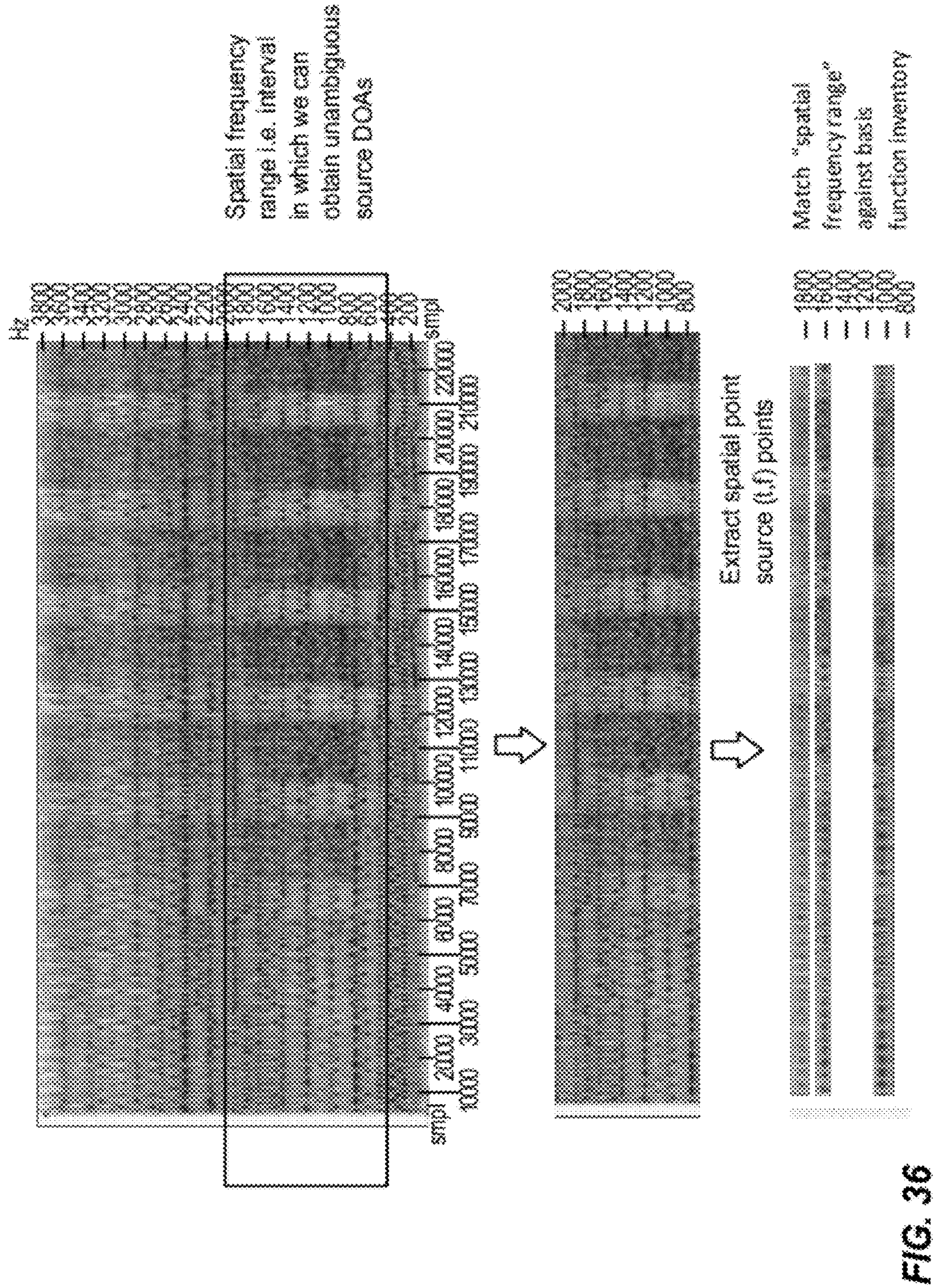
FIG. 36 shows a spectrogram of a "spatial frequency range" of the signal shown in FIG. 19 and illustrates regions of the "spatial frequency range" of the observed signal that correspond to activated basis functions.

For a given microphone array, the range of frequencies of a signal captured by the array that can be used to provide unambiguous source localization information (e.g., DOA) is typically limited by factors relating to the dimensions of the array. For example, a lower end of this limited frequency range is related to the aperture of the array, which may be too small to provide reliable spatial information at low frequencies. A higher end of this limited frequency range is related to the smallest distance between adjacent microphones, which sets an upper frequency limit on unambiguous spatial information (due to spatial aliasing). For a given microphone array, we call the range of frequencies over which reliable spatial information may be obtained the "spatial frequency range" of the array. FIG. 36 shows a spectrogram (frequency in Hz vs. time in samples) of a spatial frequency range of the spectrogram of guitar notes shown in FIG. 19. We apply a method as described herein to extract time-frequency (T-F) points from such a range of the observed signal.

Task U110 may be configured to estimate the source direction of each T-F point based on a difference between the phases of the T-F point in different channels of the multichannel signal (the ratio of phase difference to frequency is an indication of direction of arrival). Additionally or alternatively, task U110 may be configured to estimate the source direction of each T-F point based on a difference between the gain (i.e., the magnitude) of the T-F point in different channels of the multichannel signal.

Task U120 selects a set of the T-F points based on their estimated source directions. In one example, task U120 selects T-F points whose estimated source directions are similar to (e.g., within ten, twenty, or thirty degrees of) a specified source direction. The specified source direction may be a preset value, and task U120 may be repeated for different specified source directions (e.g., for different spatial sectors). Alternatively, such an implementation of task U120 may be configured to select one or more specified source directions according to the number and/or the total energy of T-F points that have similar estimated source directions. In such a case, task U120 may be configured to select, as a specified source direction, a direction that is similar to the estimated source directions of some specified number (e.g., twenty or thirty percent) of the T-F points.

In another example, task U120 selects T-F points that are related to other T-F points in the spatial frequency range in terms of both estimated source direction and frequency. In such a case, task U120 may be configured to select T-F points that have similar estimated source directions and frequencies that are harmonically related.

Task U130 matches one or more among an inventory of basis functions to the selected set of T-F points. Task U130 analyzes the selected T-F points using a single-channel sparse recovery technique. Task U130 finds the sparsest coefficients using only the "spatial frequency range" portion of basis function matrix A and the identified point sources in mixture signal vector y.

Due to the harmonic structure of the spectrogram of a musical instrument, frequency content in the high-frequency band can be inferred from frequency content in a low- and/or mid-frequency band, such that analyzing the "spatial frequency range" may be sufficient to identify relevant basis functions (e.g., the basis functions that are currently activated by the sources). As described above, task T130 uses information from the spatial frequency range to identify basis functions of an inventory that are currently activated by the point sources. Once the basis functions that are relevant to point sources in the spatial frequency range have been identified, these basis functions may be used to extrapolate the spatial information to another frequency range of the input signal where reliable spatial information may not be available. For example, the basis functions may be used to remove the corresponding music sources from the original mixture spectrum over the complete frequency range.

The bottom figure in FIG. 36 illustrates the regions of the "spatial frequency range" of the observed signal that correspond to the basis functions activated by this range of the signal. (Although for convenience this figure shows regions that are continuous over time, it is noted that these regions are likely to be discontinuous in both time and frequency.)

Task U140 uses the matched basis functions to select T-F points of the multichannel signal that are outside of the spatial frequency range. These points may be expected to arise from the same sound event or events that produced the selected set of T-F points. For example, if task U130 matches the selected set of T-F points to a basis function that corresponds to a flute playing the note C6 (1046.502 Hz), then the other T-F points that task U140 selects may be expected to arise from the same flute note.

Figure 35B:
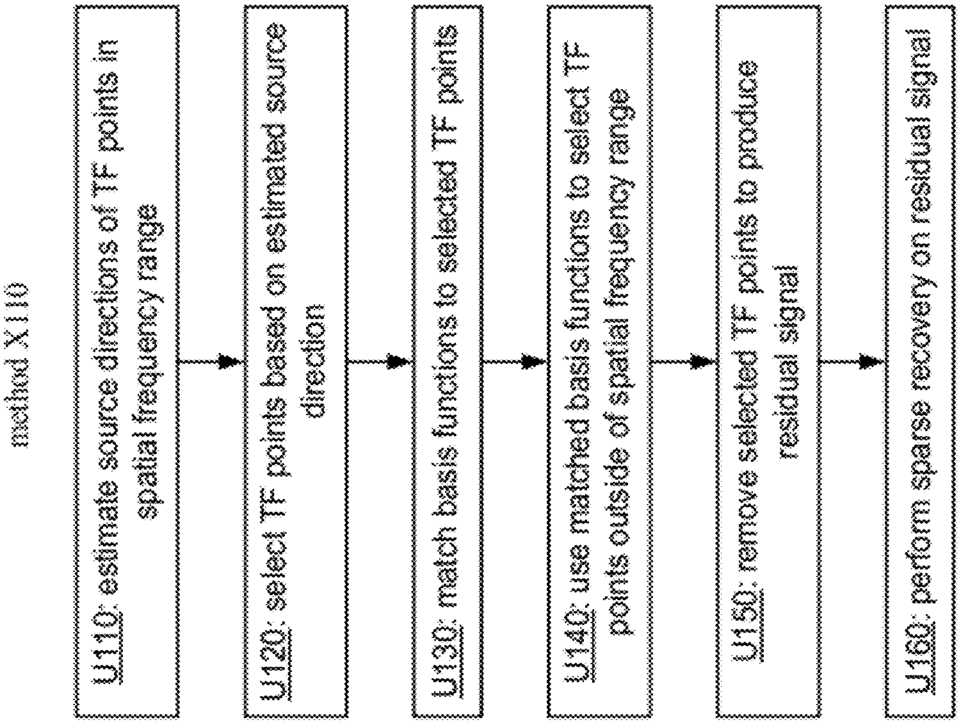
FIG. 35B shows a flowchart of an implementation X110 of method X100.
Figure 37:
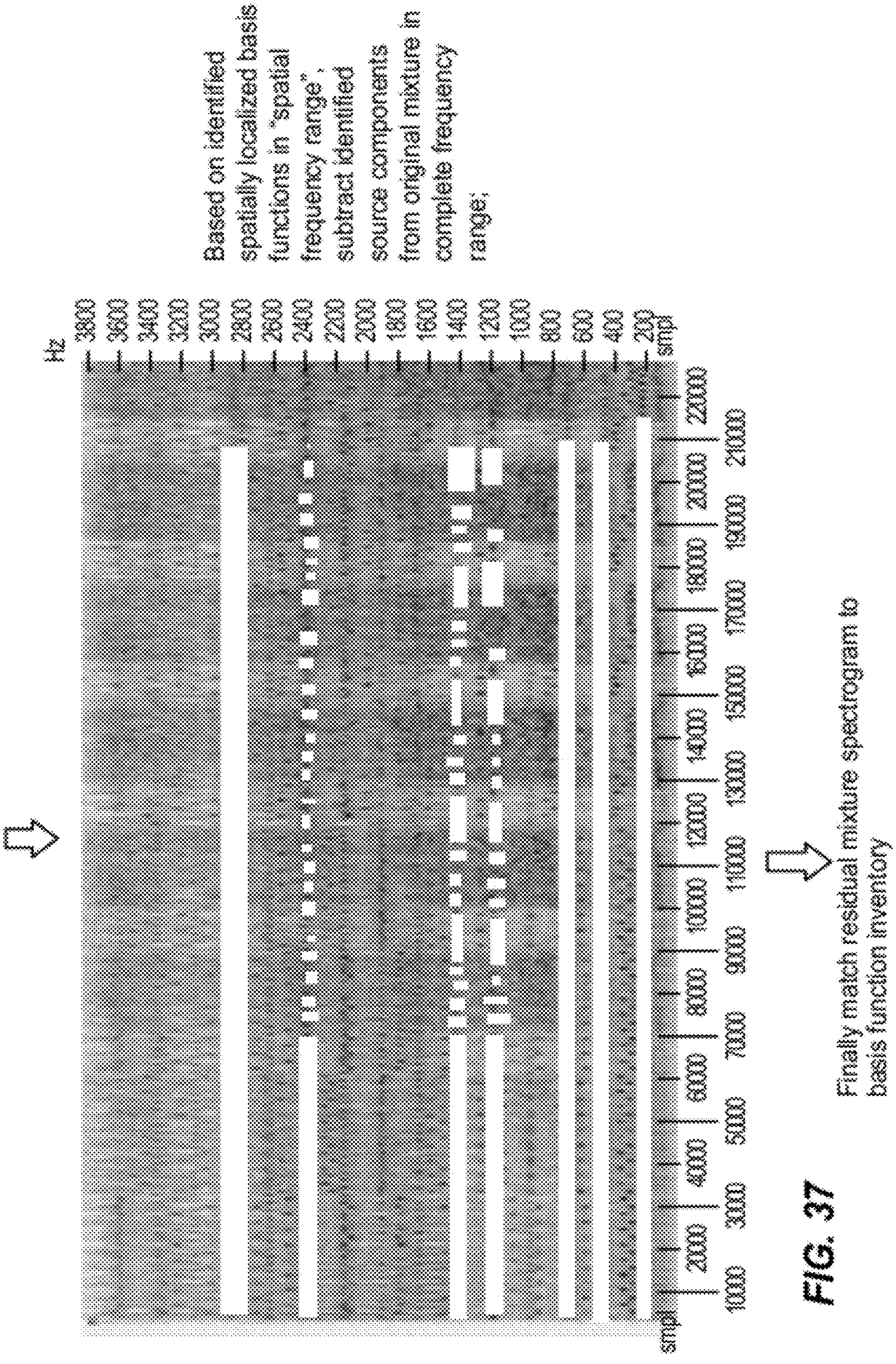
FIG. 37 shows a residual mixture spectrogram.

FIG. 35B shows a flowchart of an implementation X110 of method X100 that includes tasks U150 and U160. Task U150 removes the T-F points selected in tasks U120 and U140 from at least one channel of the multichannel signal to produce a residual signal (e.g., as shown in FIG. 37). For example, task U150 may be configured to remove (i.e., to zero out) the selected T-F points in a primary channel of the multichannel signal to produce a single-channel residual signal. Task U160 performs a sparse recovery operation on the residual signal. For example, task U160 may be configured to determine which (if any) among the inventory of basis functions are activated by the residual signal.

It may be desirable to search the sparsest representation for instruments including location cues. For example, it may be desirable to perform a sparsity-driven multi-microphone source separation that jointly executes tasks of (1) isolating sources into differentiable spatial clusters and (2) looking up corresponding basis functions, based on a single criterion of "sparse decomposition."

The approaches described above may be implemented using a basis function inventory that encodes the timbres of individual instruments. It may be desirable to perform an alternate method using a dimensionally expanded basis function matrix that also contains the phase information associated with a point source originating from certain sectors in space. Such a basis function inventory can then be used to solve the DOA mapping and instrument separation at the same time (i.e. jointly), by matching the recorded spectrograms' phase and amplitude information directly to the basis function inventory.

Such a method may be implemented as an extension of single-channel source separation, based on sparse decomposition, into a multi-microphone case. Such a method may have one or more advantages over an approach that performs spatial decomposition (e.g., beamforming) and single-channel spectral decomposition separately and sequentially. For example, such a joint method can maximally exploit the much more increased sparsity with additional spatial domain. With beamforming, the spatially separated signal is still likely to contain significant portions of unwanted signal from the non-look direction, which may limit the performance of correct extraction of the target source with single-channel sparse decomposition.

In this case, the single-channel input spectrograms y (e.g., indicating amplitudes of time-frequency points in the respective channels) are replaced by a multi-microphone complex spectrogram $\vec{y}'$ that includes phase information. The basis function inventory A is also expanded to A□ as described below. Reconstruction may now include spatial filtering based on the identified DOA of the point source. This sparsity-driven beamforming approach can also include additional spatial constraints that are included in the set of linear constraints defining the sparse recovery problem. This multi-microphone sparse decomposition method will enable multi-player scenarios and thereby greatly enhance the user's experience.

With a joint approach, we now try to find the most probable spectral magnitude basis appended with appropriate DOA. Instead of performing beamforming, we try to look for the DOA information. Therefore, multi-microphone processing (e.g., beamforming or ICA) may be postponed until after the appropriate basis function is identified.

We can obtain strong echo path information (DOA and time lag) with a joint approach as well. Once the echo path is strong enough, this path may be detected. Using inter-correlation with extracted consecutive frames, we may obtain the time-lag information of the correlated source (in other words, the echoed source).

With a joint approach, an EM-like basis update is still possible, such that any of the following are possible: modification of the spectral envelope as in the single-channel case; modification of inter-channel difference (e.g., gain mismatch and/or phase mismatch among the microphones can be resolved); modification of spatial resolution near the solution (e.g., we can adaptively change the possible direction search range in the spatial domain).

Figure 38:
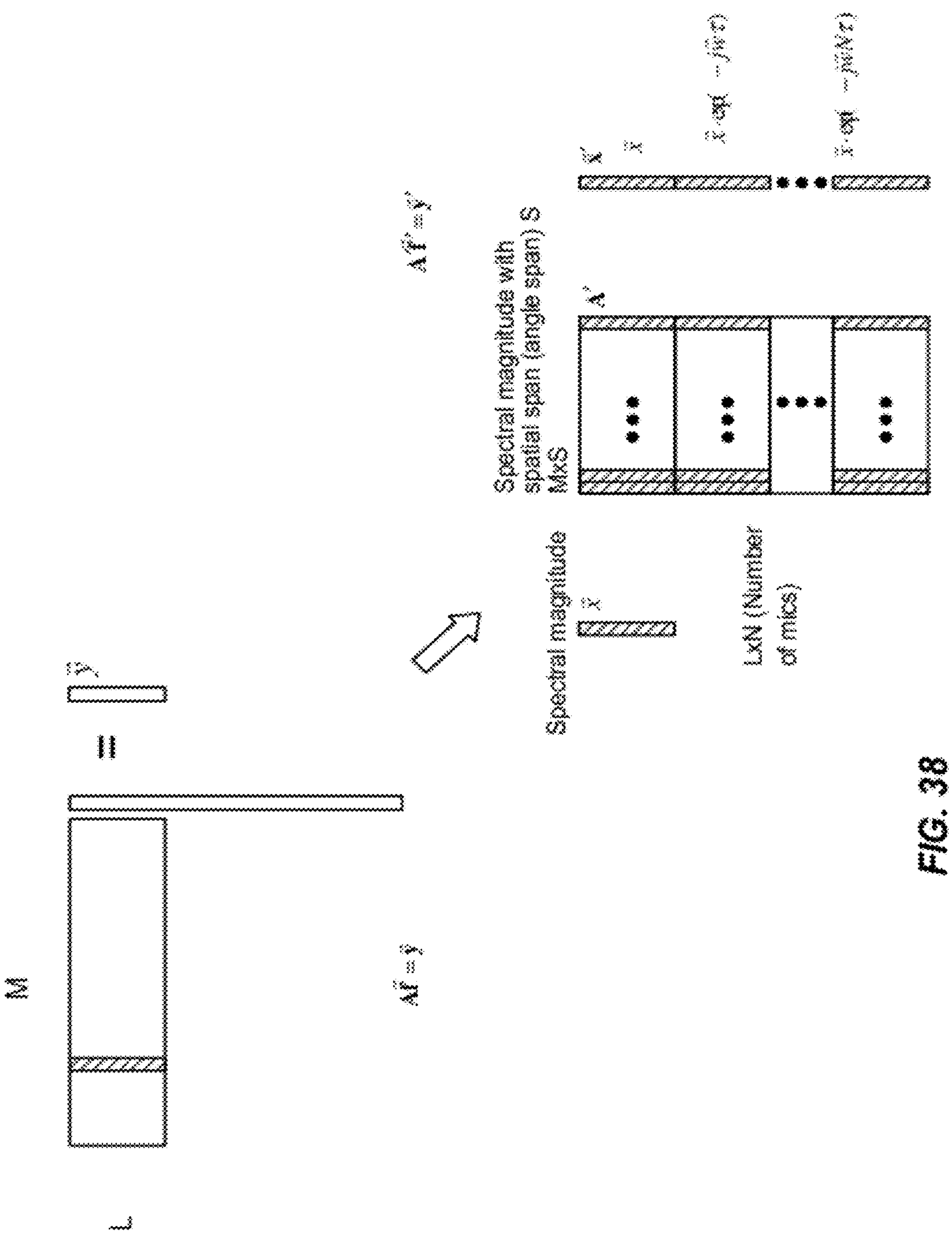
FIGS. 38 and 39 illustrate expansions of the basis function matrix.

FIG. 38 illustrates expansion of the 2D spectrogram to 3D space with spatial domain. The top right figure shows the 2D single-channel case, in which the observed spectrogram 9 for each frame of each channel is a column vector of length L (e.g., the FFT length), the basis function matrix A has M column vectors (basis functions) of length L, and the sparse coefficient vector is a column vector of length M.

Figure 39:
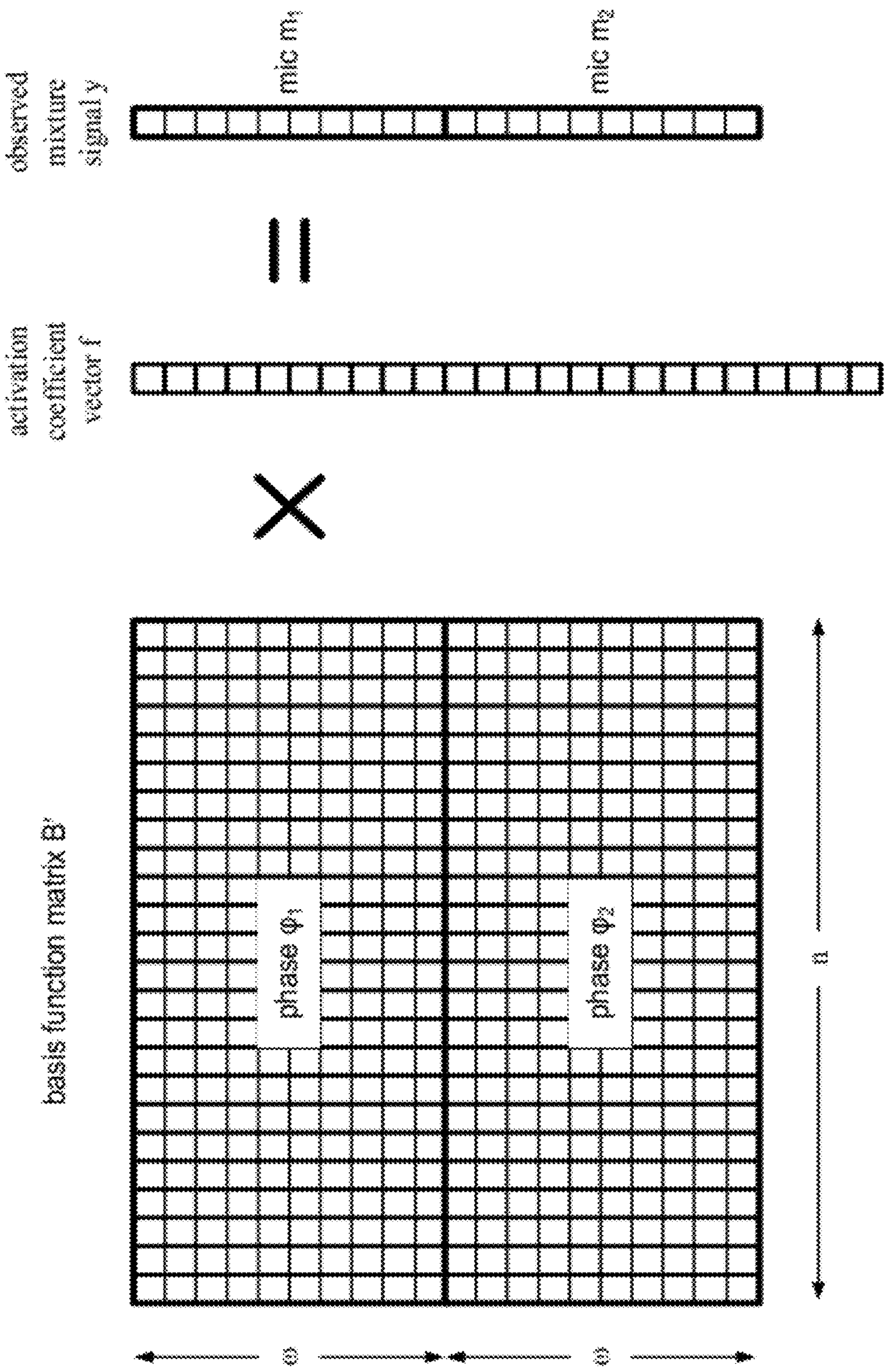

The bottom right figure in FIG. 38 shows how the L×M basis function matrix A is expanded to a matrix A□ of size (L×N)×(M×S), where N is the number of microphones used to capture the spectrogram $\vec{y}'$, and S is the spatial span (angle span) within which the sources are to be localized. Each of the basis functions of matrix A is expanded into a column of A□ by element-by-element multiplication with the vector exp $(-jn\,\vec{\omega}\tau_s)$, where each of the N vertical cells of A□ has a corresponding value of n from 0 to N−1, $\vec{\omega}$ is a vector of length L whose elements are 2πl/L for l from 0 to L−1, and $\tau_s$ has the value τ×s, where τ indicates the inter-microphone distance divided by the speed of sound, and each of the S horizontal cells of A□ (not explicitly shown in FIG. 38) has a corresponding value of s from 0 to S−1. By extending the single-channel method in this manner, we can use the DOA information in the signal to identify the best spectral magnitude response. FIG. 39 shows another illustration of such an expanded model.

Such an expansion also allows for additional spatial constraints. For example, the minimum $\|f\|_{l1}$ and $\|y'-A'f\|_{l2}$ may not guarantee all the inherent properties, such as the continuity of the spatial location. One spatial constraint that may be applied pertains to bases for the same note from the same instrument. In this case, the multiple basis functions that describe one note of the same instrument should reside in the same or similar spatial location when they are activated. For example, the attack, decay, sustain, and release parts of the note may be constrained to occur in the similar spatial location.

Another spatial constraint that may be applied pertains to bases for all notes produced by the same instrument. In this case, the locations of the activated basis functions that represent the same instrument should have continuity in time with high probability. Such spatial constraints may be applied to reduce the searching space dynamically and/or to give a penalty to a probability which implies a transition of location.

The top figure in FIG. 36 shows an example of a spectrogram of a mixture signal. The middle figure in FIG. 36 shows a spectrogram of the "spatial frequency range" of this signal, i.e. a frequency range from which we can obtain unambiguous source directions of arrival (DOAs) given the dimensions of the microphone array used to capture the signal. We apply a method as described herein to extract time-frequency ["(t, f)"] points from such an observed signal.

We begin by matching the "spatial frequency range" of the observed signal against the basis function inventory, to identify the basis functions that are activated by this range. The bottom figure in FIG. 36 illustrates the regions of the "spatial frequency range" of the observed signal that correspond to the basis functions activated by this range of the signal. (Although for convenience this figure shows regions that are continuous over time, it is noted that these regions are likely to be discontinuous in both time and frequency.)

Figure 26:
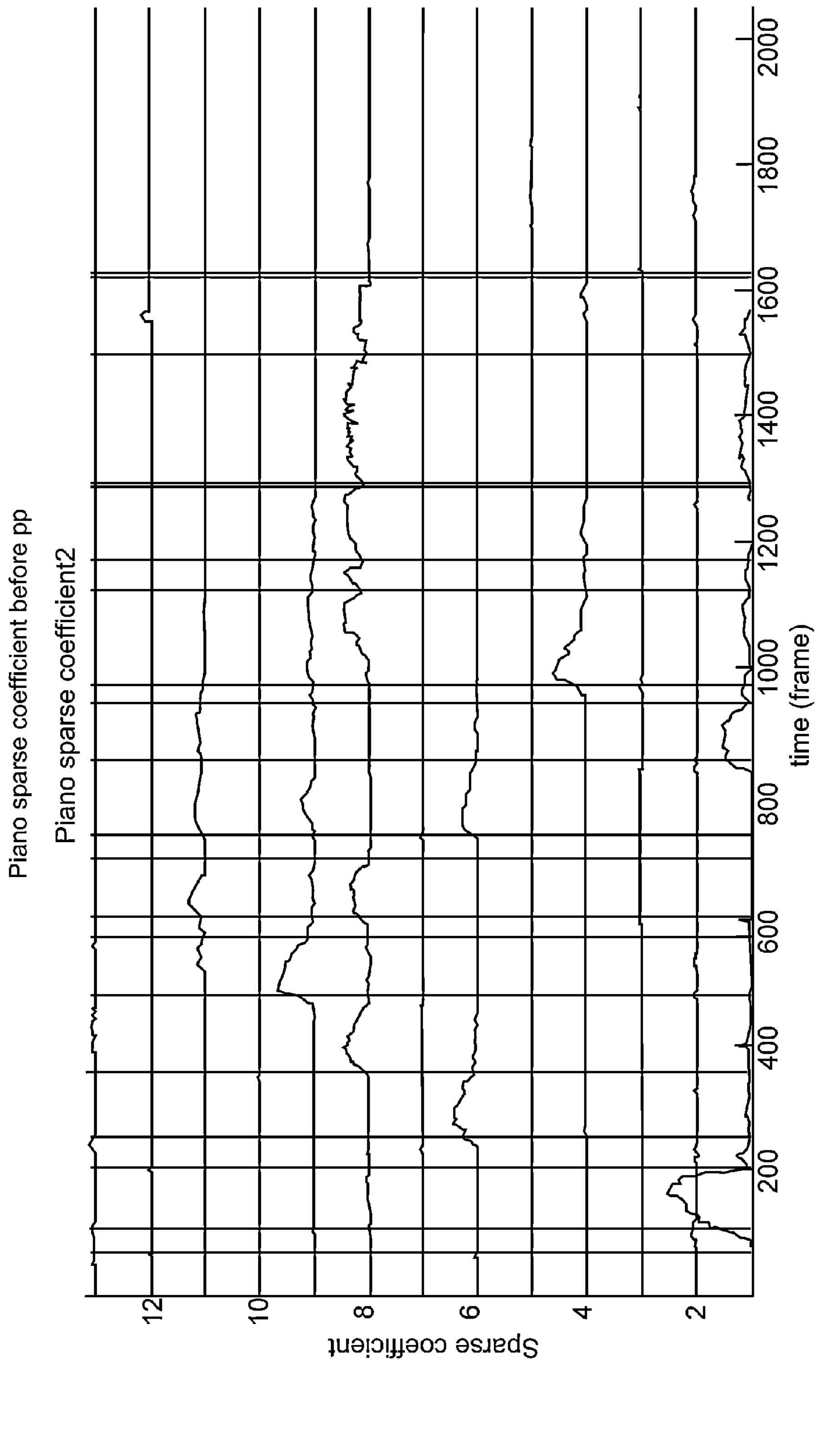
FIGS. 26-30 demonstrate results of applying onset-detection-based post-processing to a second composite signal example.

Based on these identified basis functions, we may then subtract corresponding source components from the original mixture signal over the complete frequency range, as shown in FIG. 37 (as noted with reference to the bottom figure of FIG. 26, these regions are likely to be discontinuous in both time and frequency). It may also be desirable to continue (e.g., to iterate the method) by matching the resulting residual mixture spectrogram to the basis function inventory (e.g., to identify the next most active instrument in the signal, or to identify one or more spatially distributed sources in a spatially extended method as described below).

It may be desirable to perform a method as described above using a dimensionally expanded basis function matrix, to extract spatially localized point sources (e.g., such that the basis functions that are identified from the "spatial frequency range" are also spatially localized). Such a method may include computing the spatial origin of the mixture spectrogram (t,f) points in the "spatial frequency range." Such localization may be based on differences between levels (e.g., gain or magnitude) and/or phases of the observed microphone signals. Such a method may also include extracting spatially consistent point sources from the mixture spectrogram and matching the extracted point-source spectrograms against the basis function inventory in the "spatial frequency range." Such a method may include using the matched basis functions to remove the spatial point sources from the mixture spectrogram in the complete frequency range. Such a method may also include matching the residual mixture spectrogram to the basis function inventory to extract spatially distributed sources.

It may be desirable to search the sparsest representation for instruments including location cues. For example, it may be desirable to perform a sparsity-driven multi-microphone source separation that jointly executes tasks of (1) isolating sources into differentiable spatial clusters and (2) looking up corresponding basis functions, based on a single criterion of "sparse decomposition."

FIG. 39 shows an extension of the model of FIG. 9 from the single-channel case to the multi-microphone case. In this case, the single-channel input spectrogram y (e.g., indicating amplitudes of time-frequency points) is replaced by a multi-microphone complex spectrogram $\vec{y}'$, which includes phase information. The basis function matrix B is also expanded to B□ as described herein. Reconstruction may now include spatial filtering based on the identified DOA of the point source.

For computational tractability, it may be desirable for the plurality B of basis functions to be considerably smaller than the inventory A of basis functions. It may be desirable to narrow down the inventory for a given separation task, starting from a large inventory. In one example, such a reduction may be performed by determining whether a segment includes sound from percussive instruments or sound from harmonic instruments, and selecting an appropriate plurality B of basis functions from the inventory for matching. Percussive instruments tend to have impulse-like spectrograms (e.g., vertical lines) as opposed to horizontal lines for harmonic sounds.

A harmonic instrument may typically be characterized in the spectrogram by a certain fundamental pitch and associated timbre, and a corresponding higher-frequency extension of this harmonic pattern. Consequently, in another example it may be desirable to reduce the computational task by only analyzing lower octaves of these spectra, as their higher frequency replica may be predicted based on the low-frequency ones. After matching, the active basis functions may be extrapolated to higher frequencies and subtracted from the mixture signal to obtain a residual signal that may be encoded and/or further decomposed.

Such a reduction may also be performed through user selection in a graphical user interface and/or by pre-classification of most likely instruments and/or pitches based on a first sparse recovery run or maximum likelihood fit. For example, a first run of the sparse recovery operation may be performed to obtain a first set of recovered sparse coefficients, and based on this first set, the applicable note basis functions may be narrowed down for another run of the sparse recovery operation.

One reduction approach includes detecting the presence of certain instrument notes by measuring sparsity scores in certain pitch intervals. Such an approach may include refining the spectral shape of one or more basis functions, based on initial pitch estimates, and using the refined basis functions as the plurality B in method M100.

A reduction approach may be configured to identify pitches by measuring sparsity scores of the music signal projected into corresponding basis functions. Given the best pitch scores, the amplitude shapes of basis functions may be optimized to identify instrument notes. The reduced set of active basis functions may then be used as the plurality B in method M100.

Figure 18:
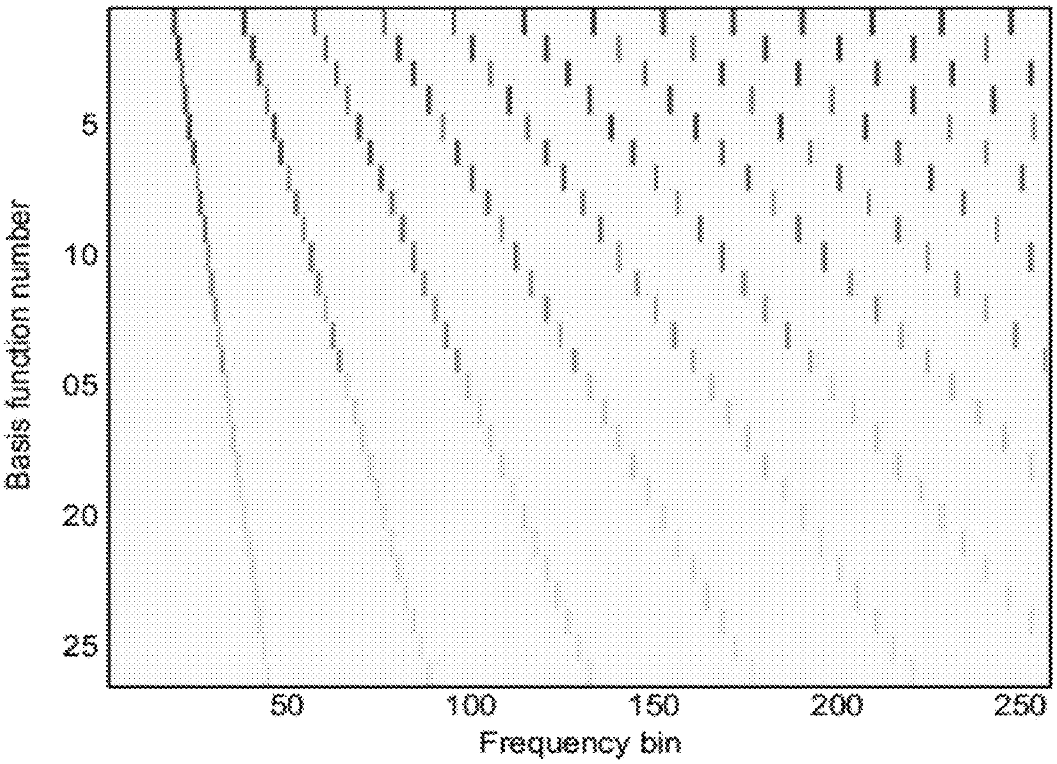
FIG. 18 shows a first example of a basis function inventory.
Figure 19:
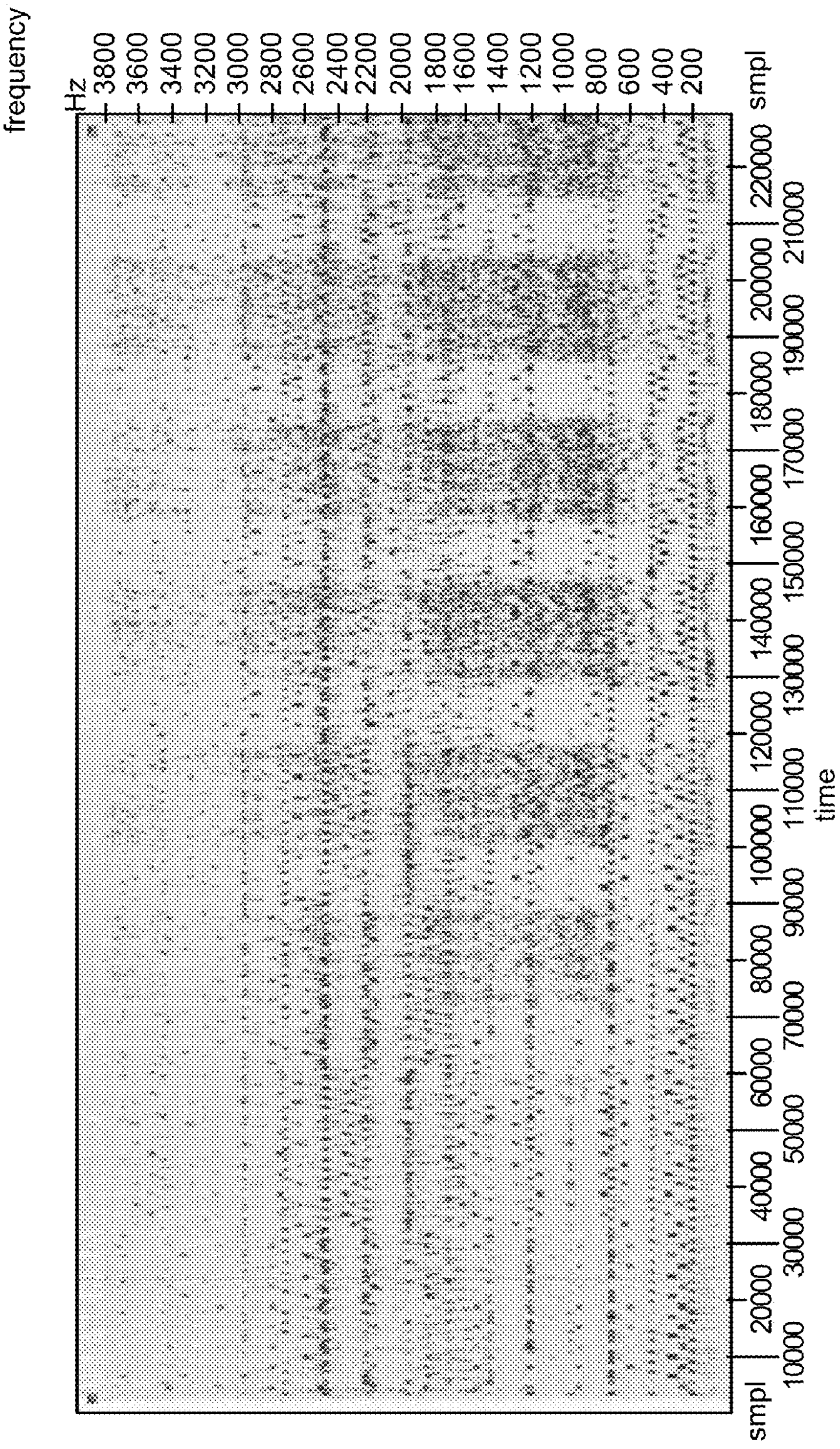
FIG. 19 shows a spectrogram of guitar notes.
Figure 20:
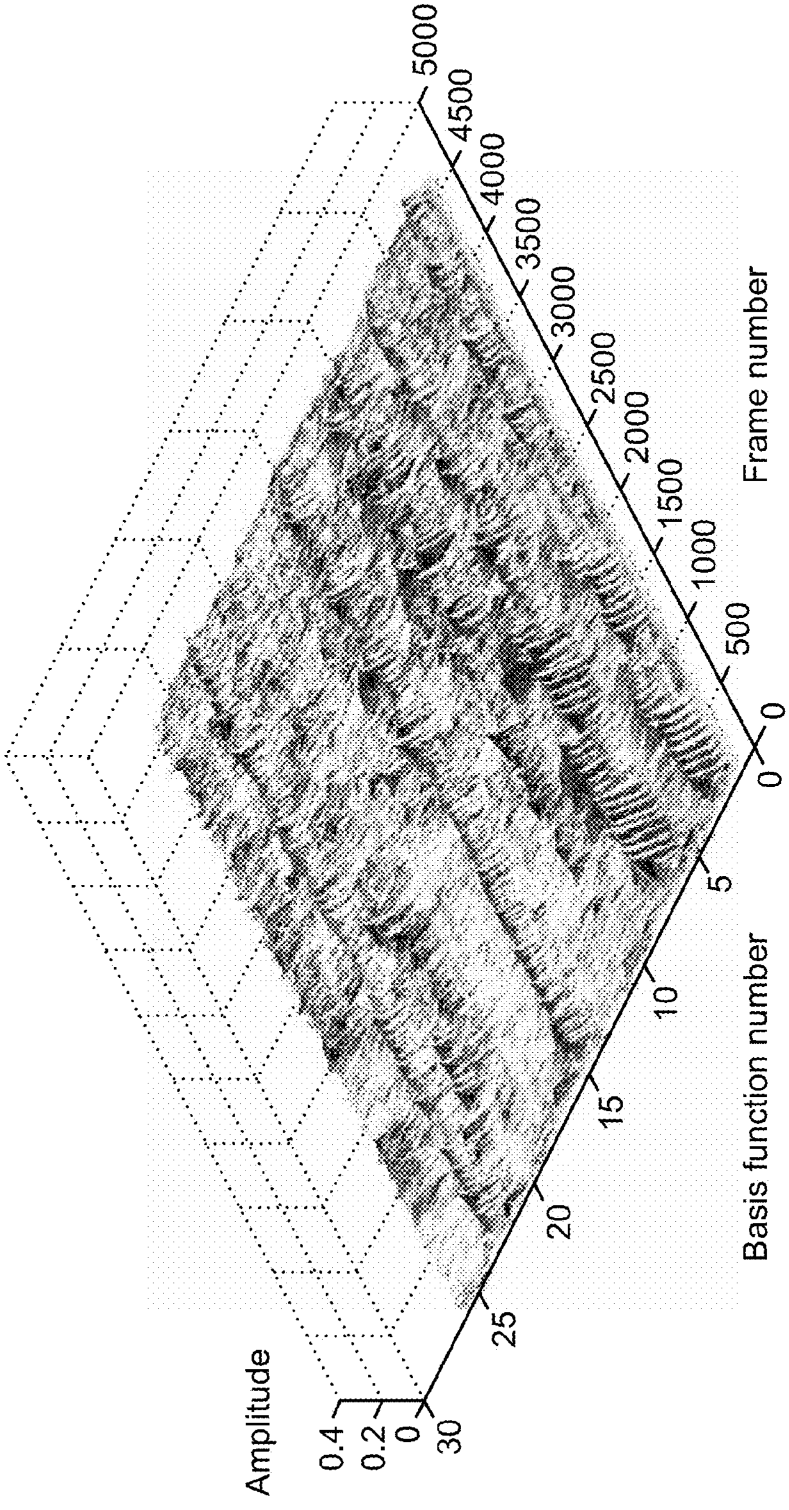
FIG. 20 shows a sparse representation of the spectrogram of FIG. 19 in the inventory of FIG. 18.

FIG. 18 shows an example of a basis function inventory for sparse harmonic signal representation that may be used in a first-run approach. FIG. 19 shows a spectrogram of guitar notes (frequency in Hz vs. time in samples), and FIG. 20 shows a sparse representation of this spectrogram (basis function number vs. time in frames) in the set of basis functions shown in FIG. 18.

Figure 4A:
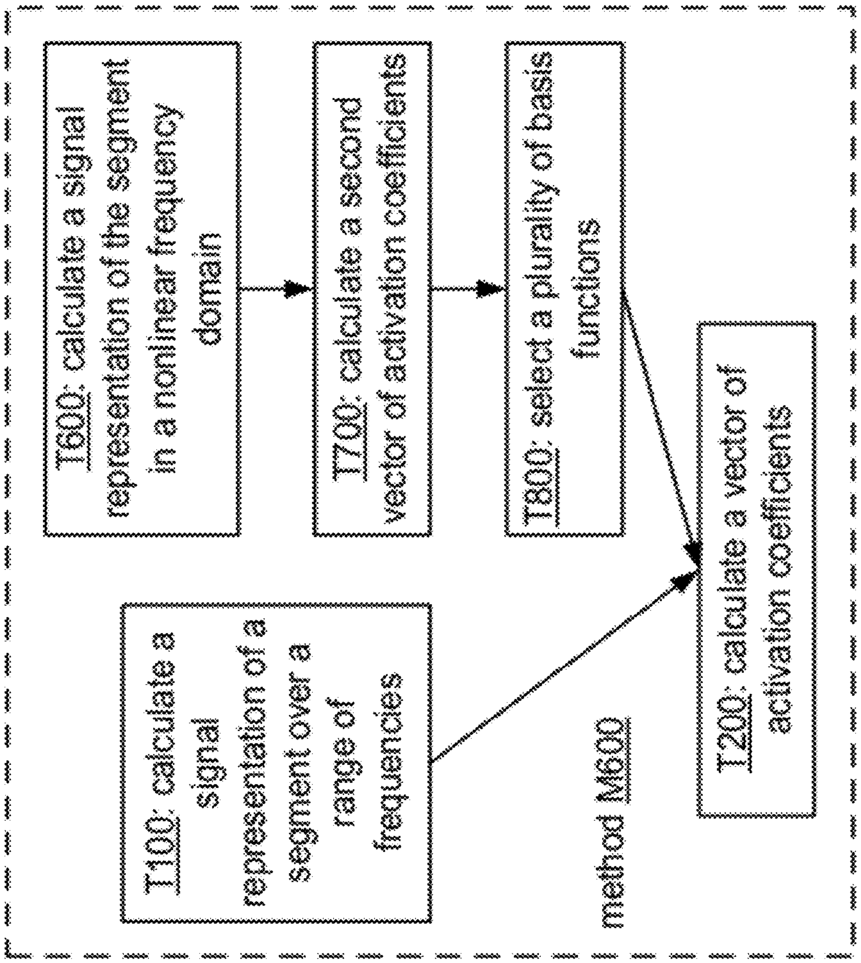
FIG. 4A shows a flowchart for an implementation M600 of method M100

FIG. 4A shows a flowchart for an implementation M600 of method M100 that includes such a first-run inventory reduction. Method M600 includes a task T600 that calculates a signal representation of a segment in a nonlinear frequency domain (e.g., in which the frequency distance between adjacent elements increases with frequency, as in a mel or Bark scale). In one example, task T600 is configured to calculate the nonlinear signal representation using a constant-Q transform. Method M600 also includes a task T700 that calculates a second vector of activation coefficients, based on the nonlinear signal representation and on a plurality of similarly nonlinear basis functions. Based on information from the second activation coefficient vector (e.g., from the identities of the activated basis functions, which may indicate an active pitch range), task T800 selects the plurality B of basis functions for use in task T200. It is expressly noted that methods M200, M300, and M400 may also be implemented to include such tasks T600, T700, and T800.

Figure 5:
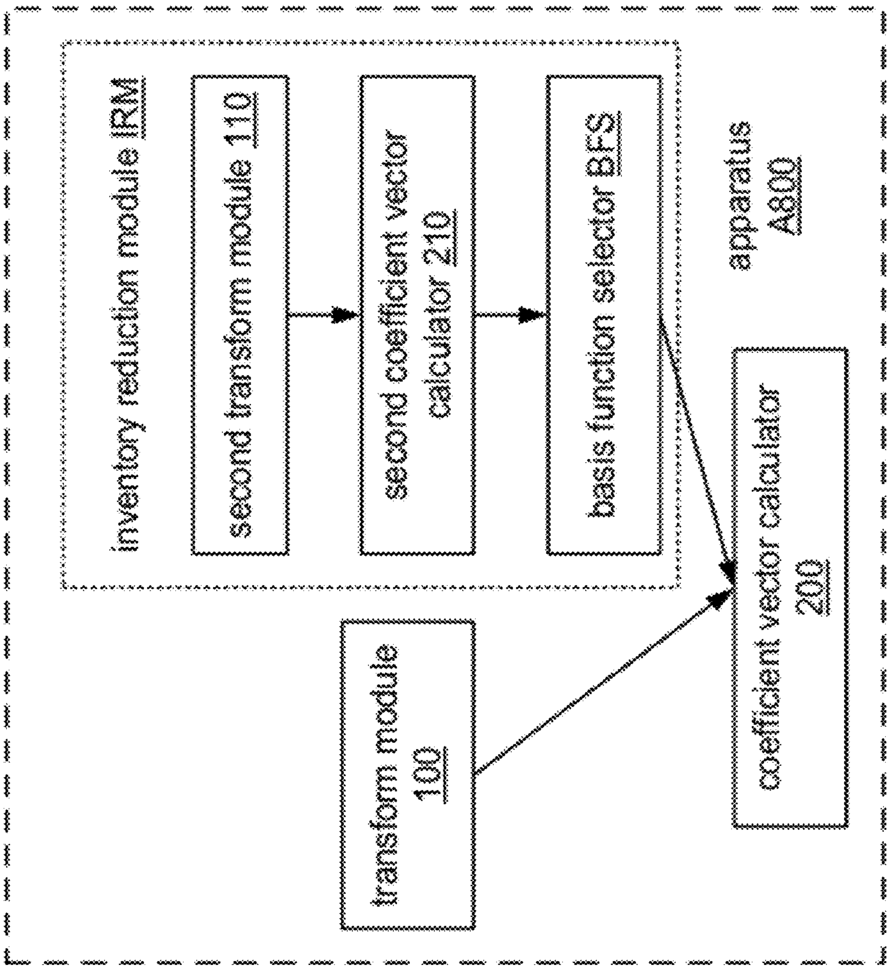
FIG. 5 shows a block diagram of an implementation A800 of apparatus A100.

FIG. 5 shows a block diagram of an implementation A800 of apparatus A100 that includes an inventory reduction module IRM configured to select the plurality of basis functions from a larger set of basis functions (e.g., from an inventory). Module IRM includes a second transform module 110 configured to calculate a signal representation for a segment in a nonlinear frequency domain (e.g., according to a constant-Q transform). Module IRM also includes a second coefficient vector calculator 210 configured to calculate a second vector of activation coefficients, based on the calculated signal representation in the nonlinear frequency domain and on a second plurality of basis functions as described herein. Module IRM also includes a basis function selector BFS that is configured to select the plurality of basis functions from among an inventory of basis functions, based on information from the second activation coefficient vector as described herein.

Figure 32:
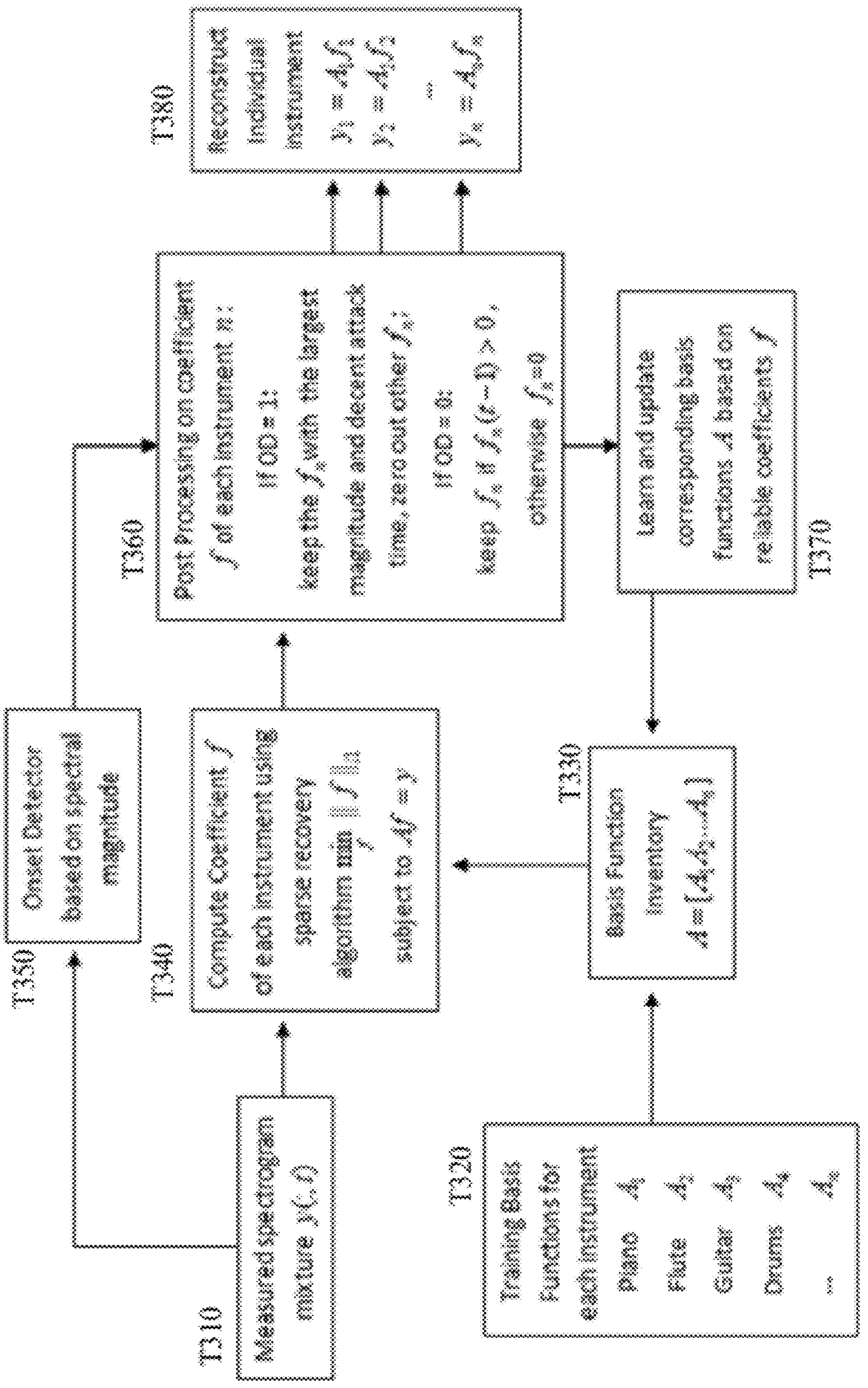
FIGS. 32 and 33 show signal processing flowcharts for a single-channel sparse recovery scheme.
Figure 33:
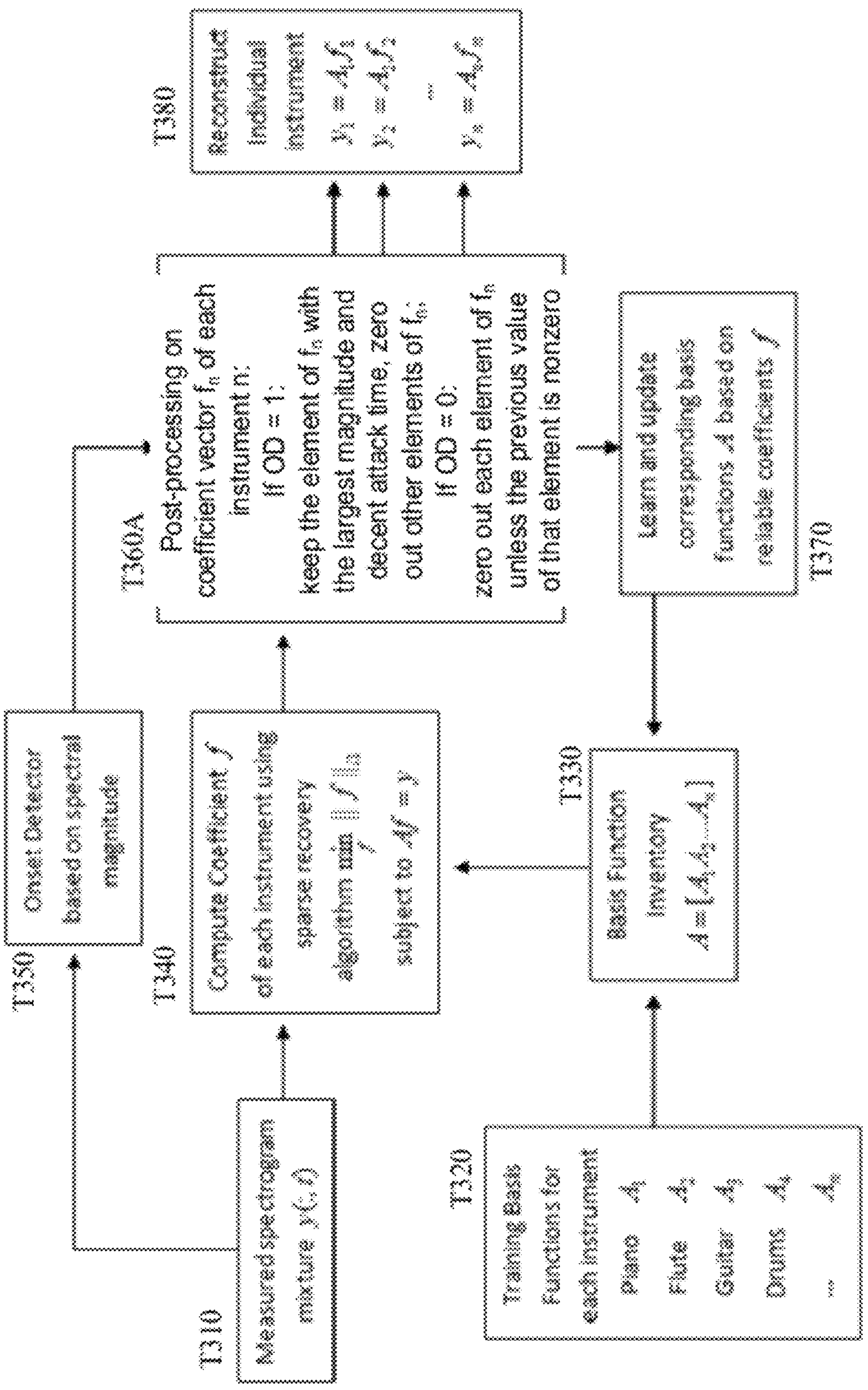

FIG. 32 shows a signal processing flowchart for a single-channel sparse recovery scheme that includes onset detection (e.g., detecting the onset of a musical note) and post-processing to re-fine harmonic instrument sparse coefficients, and FIG. 33 shows a flowchart for a similar scheme with a different version T360A of task T360. FIG. 32 shows tasks T310, T320, T330, T340, T350, T360, T370 and T380. FIG. 33 shows tasks T310, T320, T330, T340, T350, T360A, T370 and T380. The basis function inventory A may include a set $A_n$ of basis functions for each instrument n. These sets may be disjoint, or two or more sets may share one or more basis functions. The resulting activation coefficient vector f may be considered to include a corresponding subvector $f_n$ for each instrument n that includes the activation coefficients for the instrument-specific basis function set $A_n$, and these subvectors may be processed independently (e.g., as shown in tasks T360 and T360A). FIGS. 21 to 30 illustrate aspects of music decomposition using such a scheme on a composite signal example 1 (a piano and flute playing in the same octave) and a composite signal example 2 (a piano and flute playing in the same octave with percussion).

Figure 21:
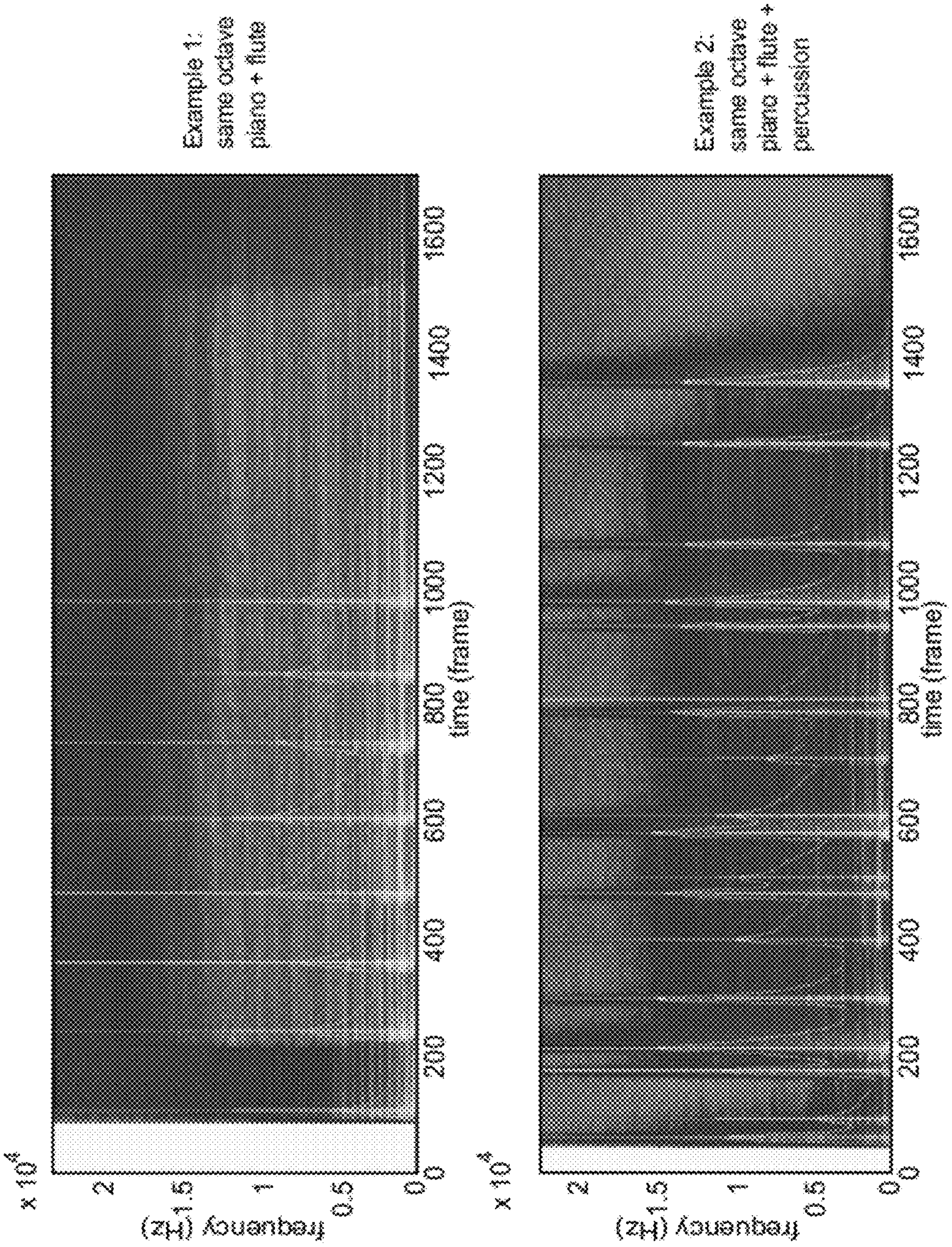
FIG. 21 shows spectrograms of results of applying a method according to FIG. 32 to two different composite signal examples.

A general onset detection method may be based on spectral magnitude (e.g., energy difference). For example, such a method may include finding peaks based on spectral energy and/or peak slope. FIG. 21 shows spectrograms (frequency in Hz vs. time in frames) of results of applying such a method to composite signal example 1 (a piano and flute playing in the same octave) and composite signal example 2 (a piano and flute playing in the same octave with percussion), respectively, where the vertical lines indicate detected onsets.

It may be desirable also to detect an onset of each individual instrument. For example, a method of onset detection among harmonic instruments may be based on corresponding coefficient difference in time. In one such example, onset detection of a harmonic instrument n is triggered if the index of the highest-magnitude element of the coefficient vector for instrument n (subvector $f_n$) for the current frame is not equal to the index of the highest-magnitude element of the coefficient vector for instrument n for the previous frame. Such an operation may be iterated for each instrument.

It may be desirable to perform post-processing of the sparse coefficient vector of a harmonic instrument. For example, for harmonic instruments it may be desirable to keep a coefficient of the corresponding subvector that has a high magnitude and/or an attack profile that meets a specified criterion (e.g., is sufficiently sharp), and/or to remove (e.g., to zero out) residual coefficients.

For each harmonic instrument, it may be desirable to post-process the coefficient vector at each onset frame (e.g., when onset detection is indicated) such that the coefficient that has the dominant magnitude and an acceptable attack time is kept and residual coefficients are zeroed. The attack time may be evaluated according to a criterion such as average magnitude over time. In one such example, each coefficient for the instrument for the current frame t is zeroed out (i.e., the attack time is not acceptable) if the current average value of the coefficient is less than a past average value of the coefficient (e.g., if the sum of the values of the coefficient over a current window, such as from frame (t−5) to frame (t+4)) is less than the sum of the values of the coefficient over a past window, such as from frame (t−15) to frame (t−6)). Such post-processing of the coefficient vector for a harmonic instrument at each onset frame may also include keeping the coefficient with the largest magnitude and zeroing out the other coefficients. For each harmonic instrument at each non-onset frame, it may be desirable to post-process the coefficient vector to keep only the coefficient whose value in the previous frame was non-zero, and to zero out the other coefficients of the vector.

Figure 22:
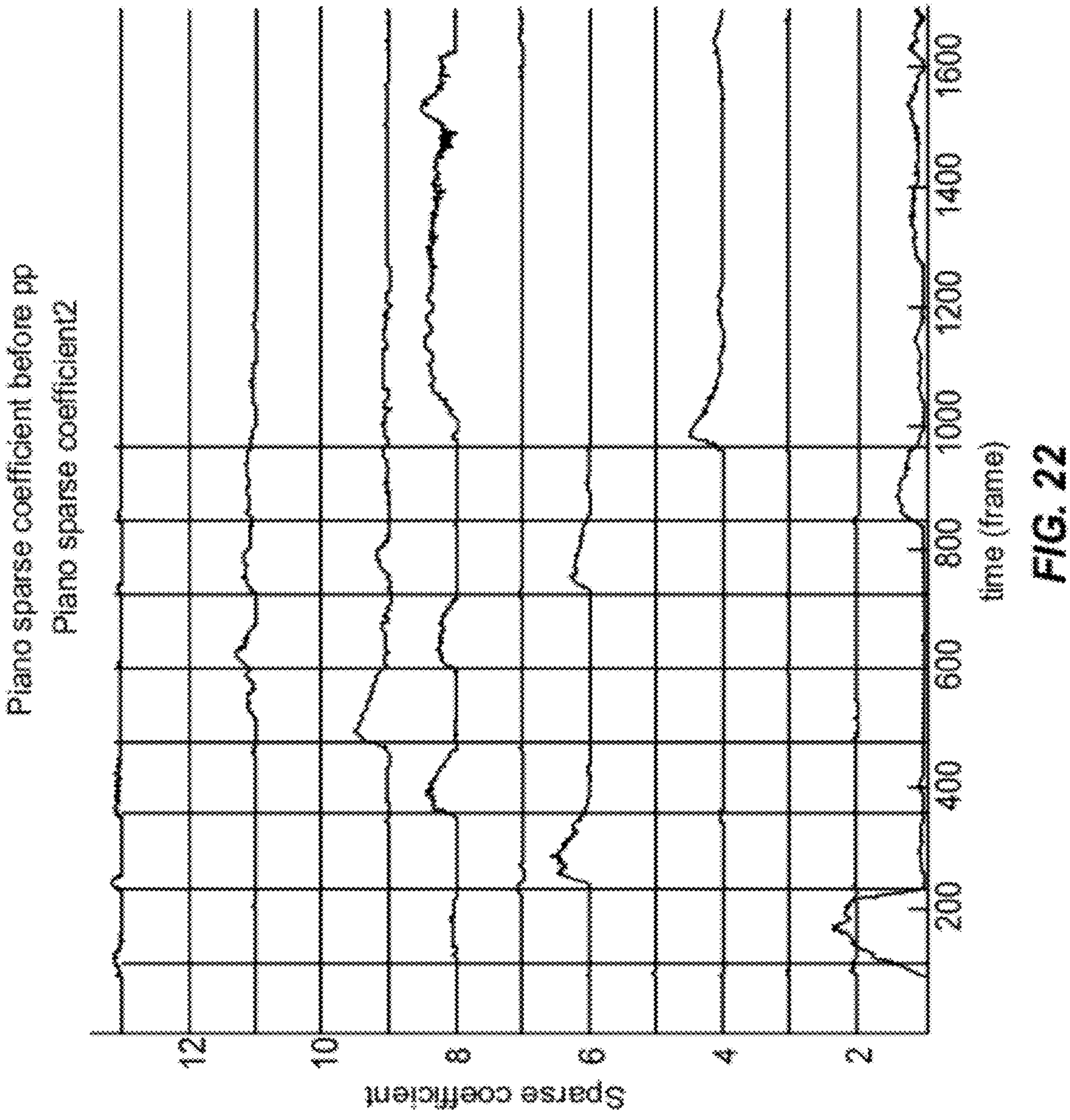
FIGS. 22-25 demonstrate results of applying onset-detection-based post-processing to a first composite signal example.
Figure 23:
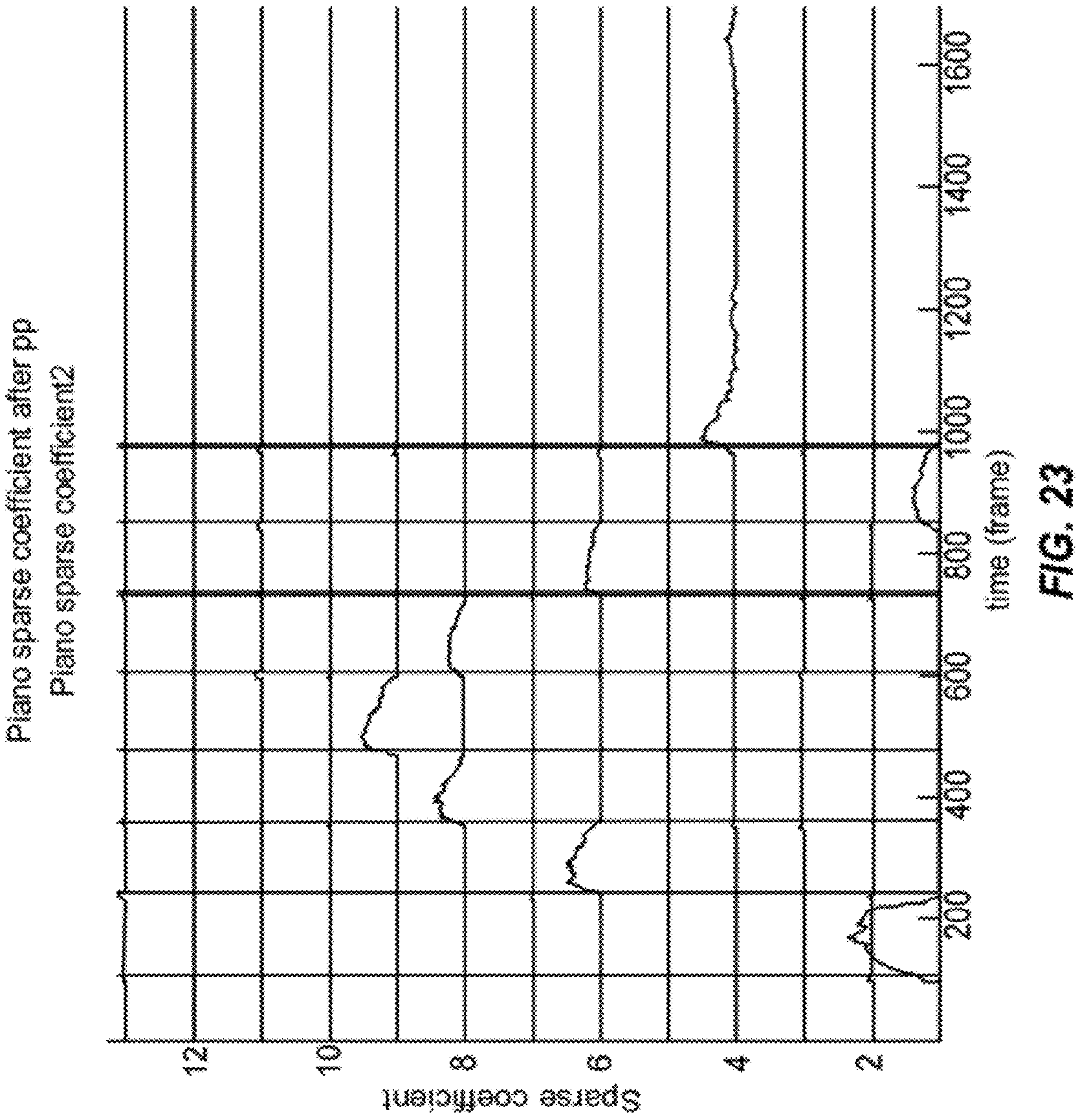
Figure 24:
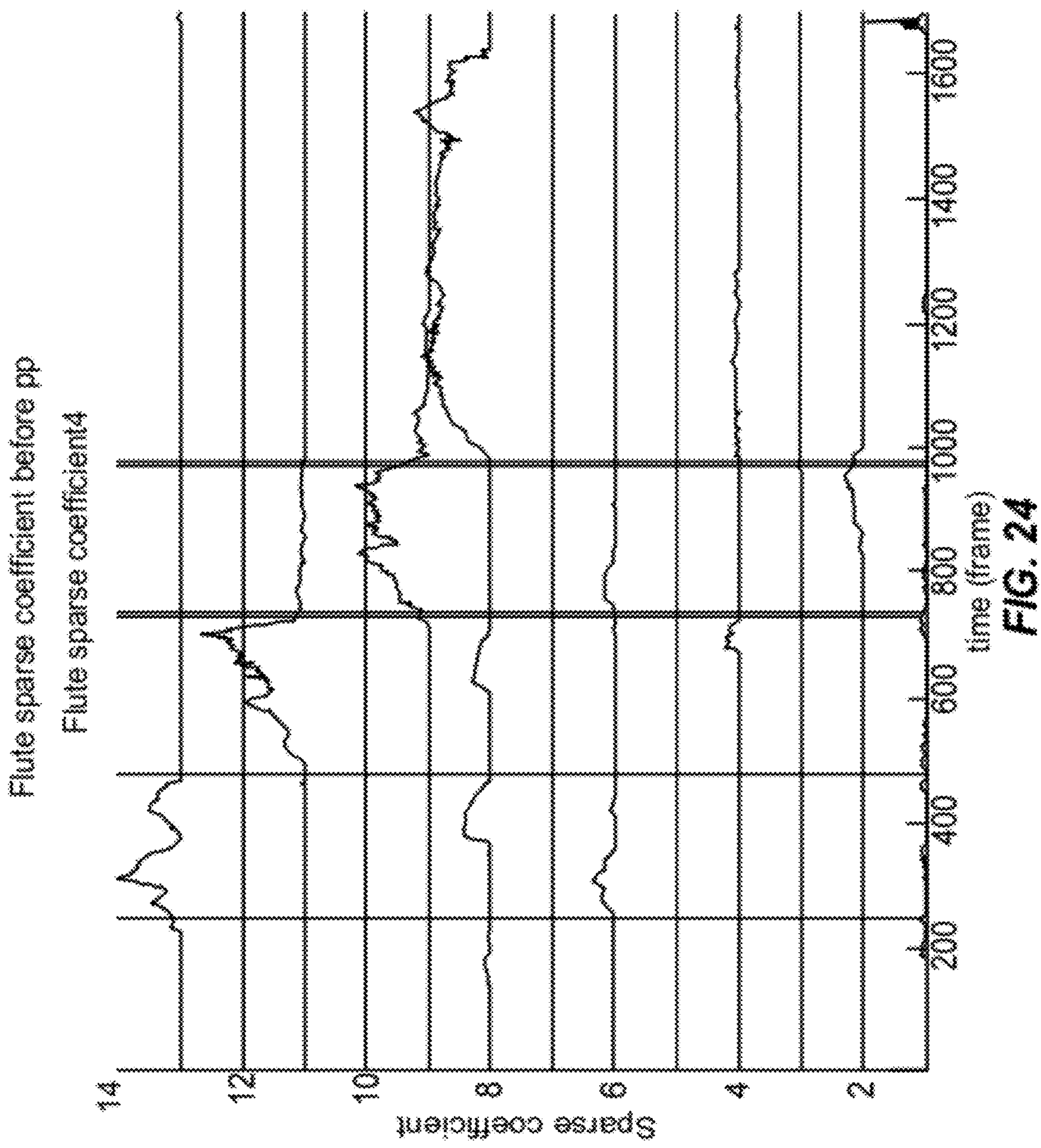
Figure 25:
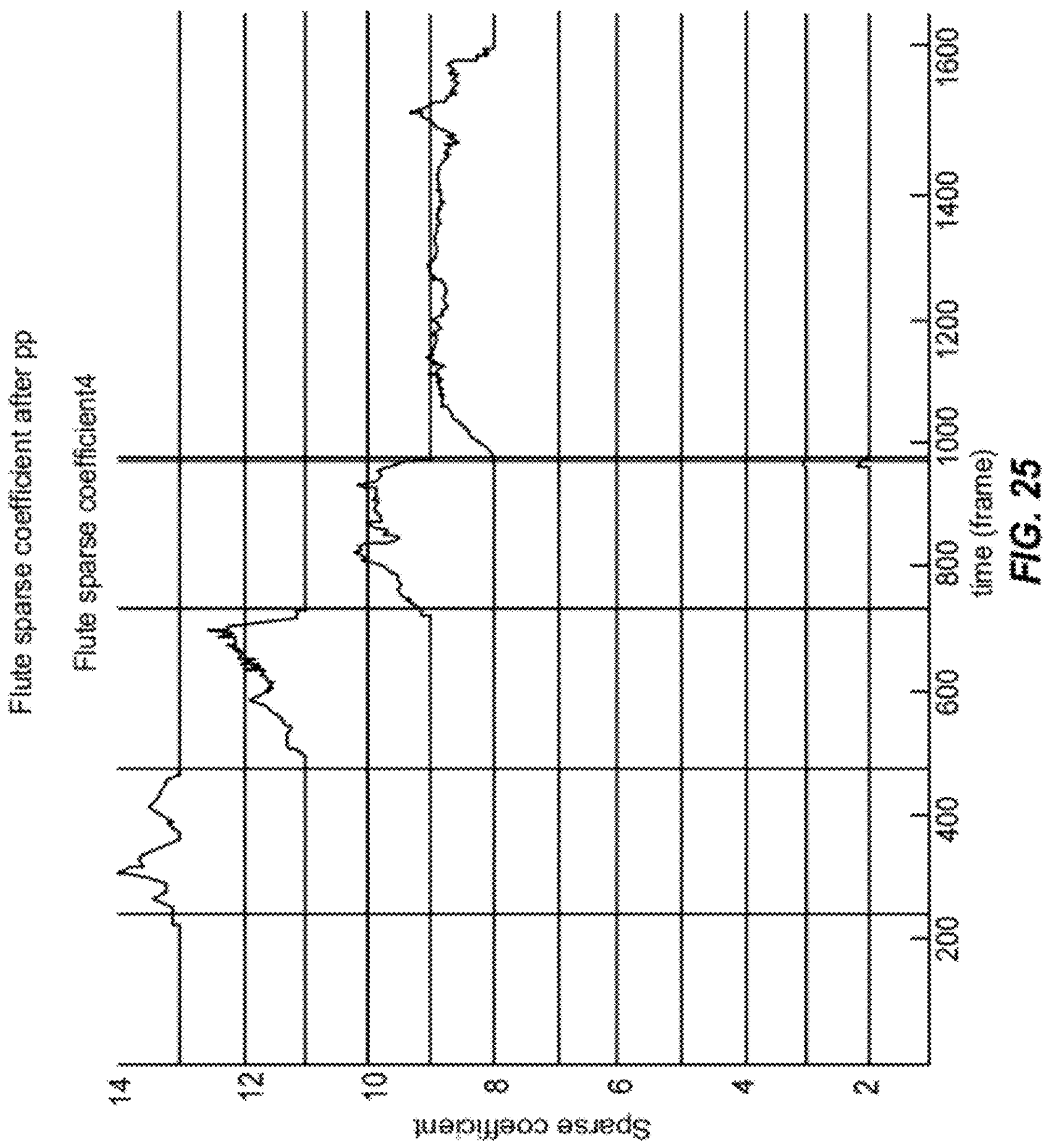

FIGS. 22-25 demonstrate results of applying onset-detection-based post-processing to composite signal example 1 (a piano and flute in playing the same octave). In these figures, the vertical axis is sparse coefficient index, the horizontal axis is time in frames, and the vertical lines indicate frames at which onset detection is indicated. FIGS. 22 and 23 show piano sparse coefficients before and after post-processing, respectively. FIGS. 24 and 25 show flute sparse coefficients before and after post-processing, respectively.

Figure 27:
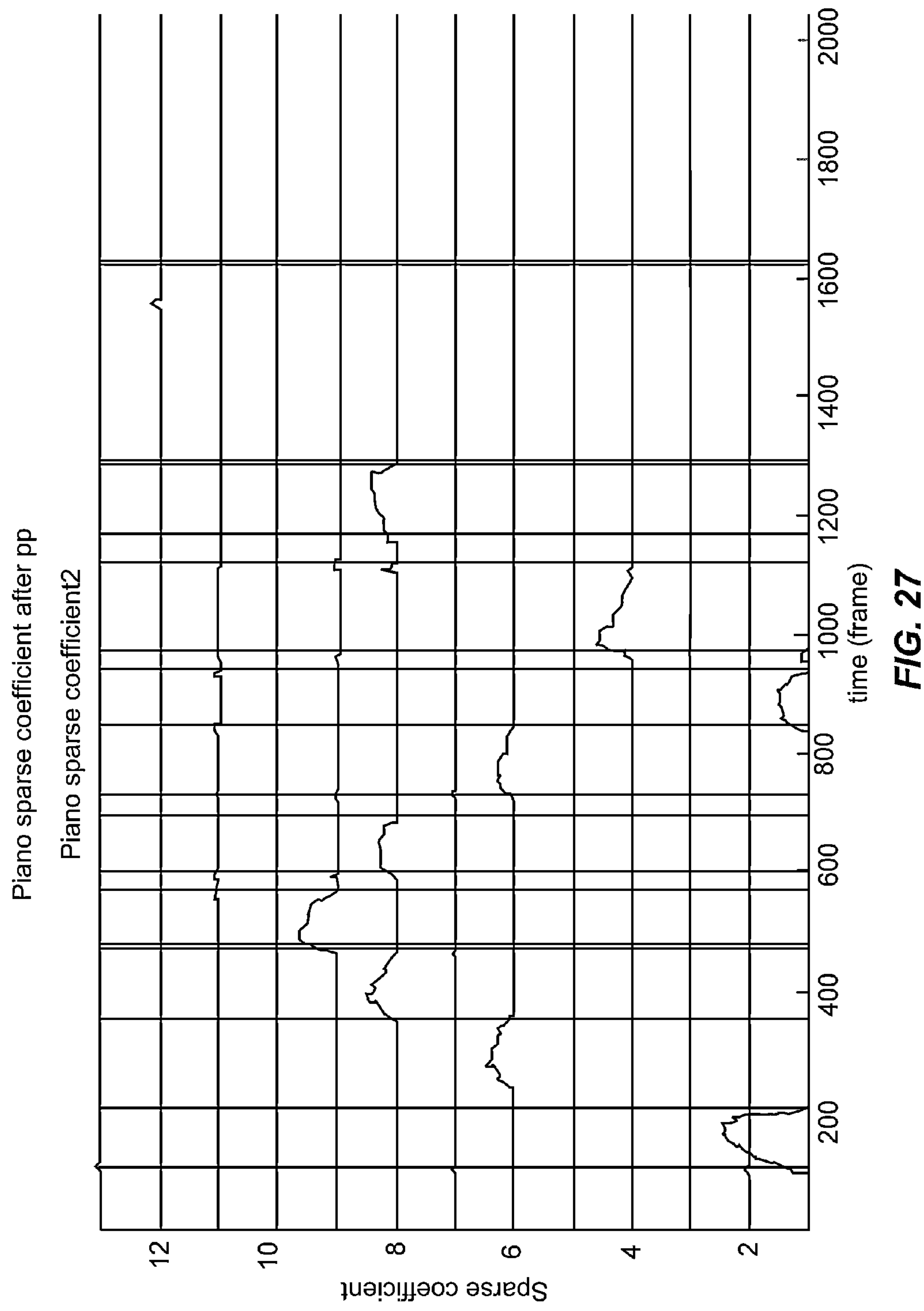
Figure 28:
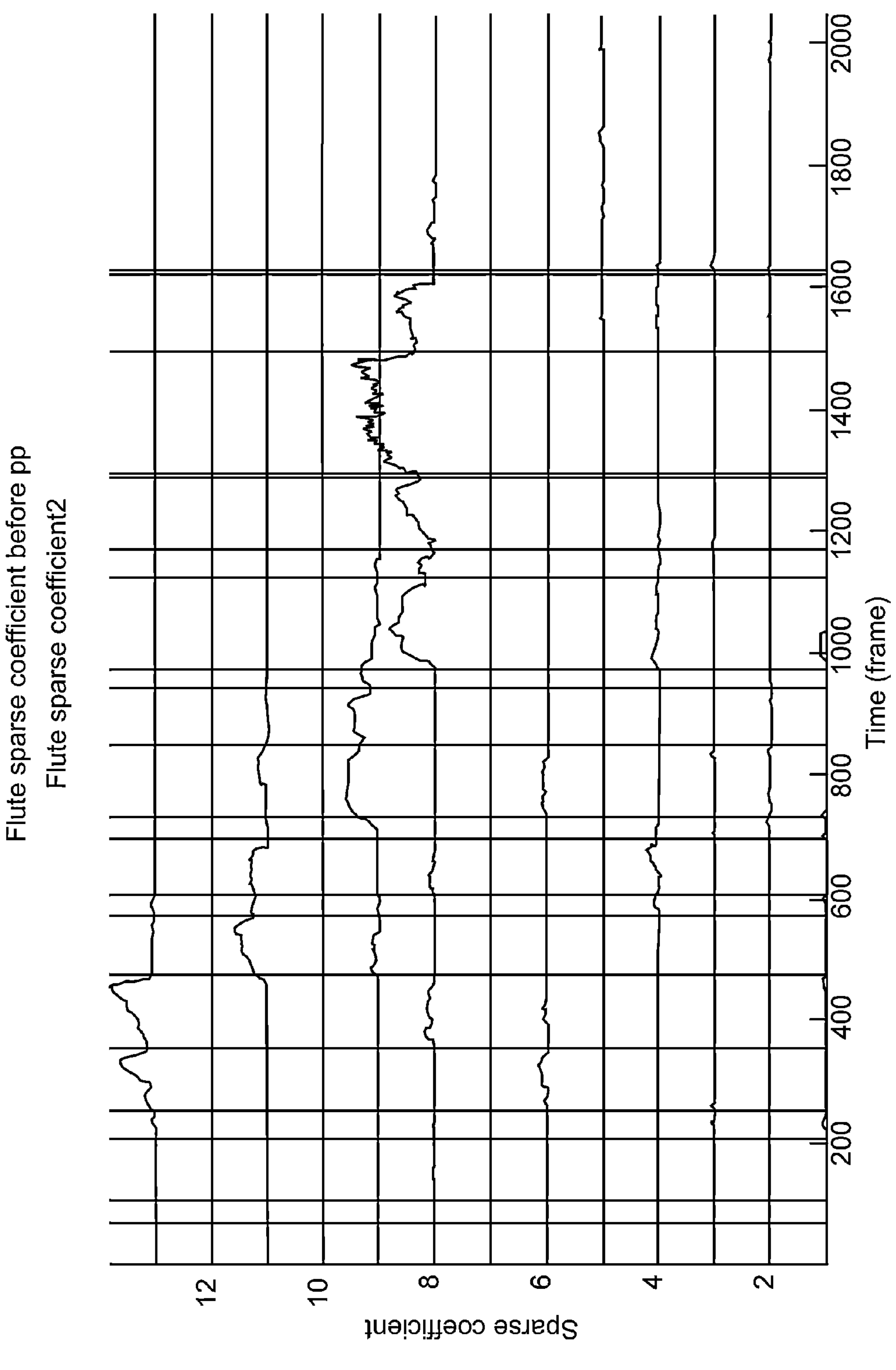
Figure 29:
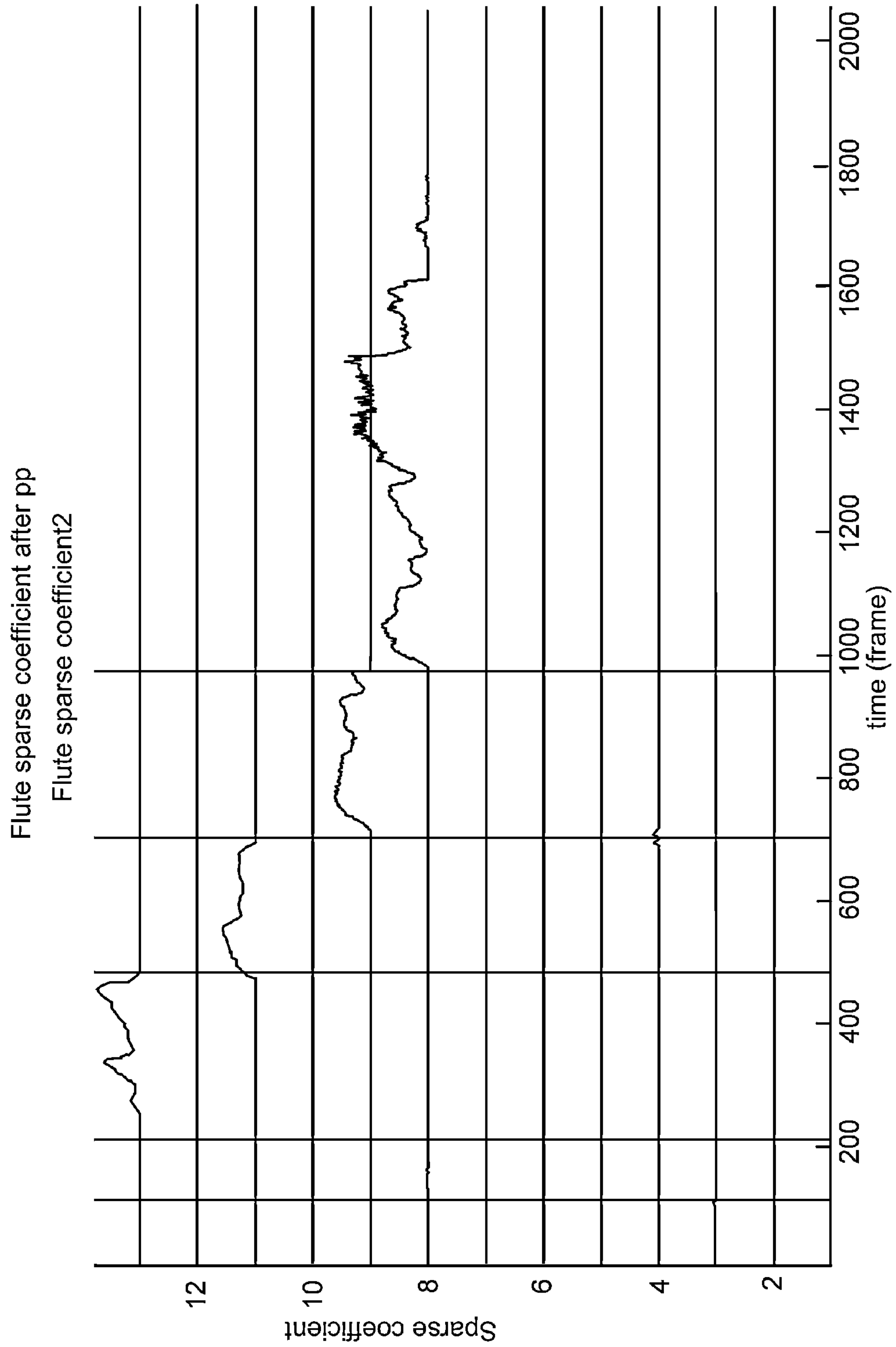
Figure 30:
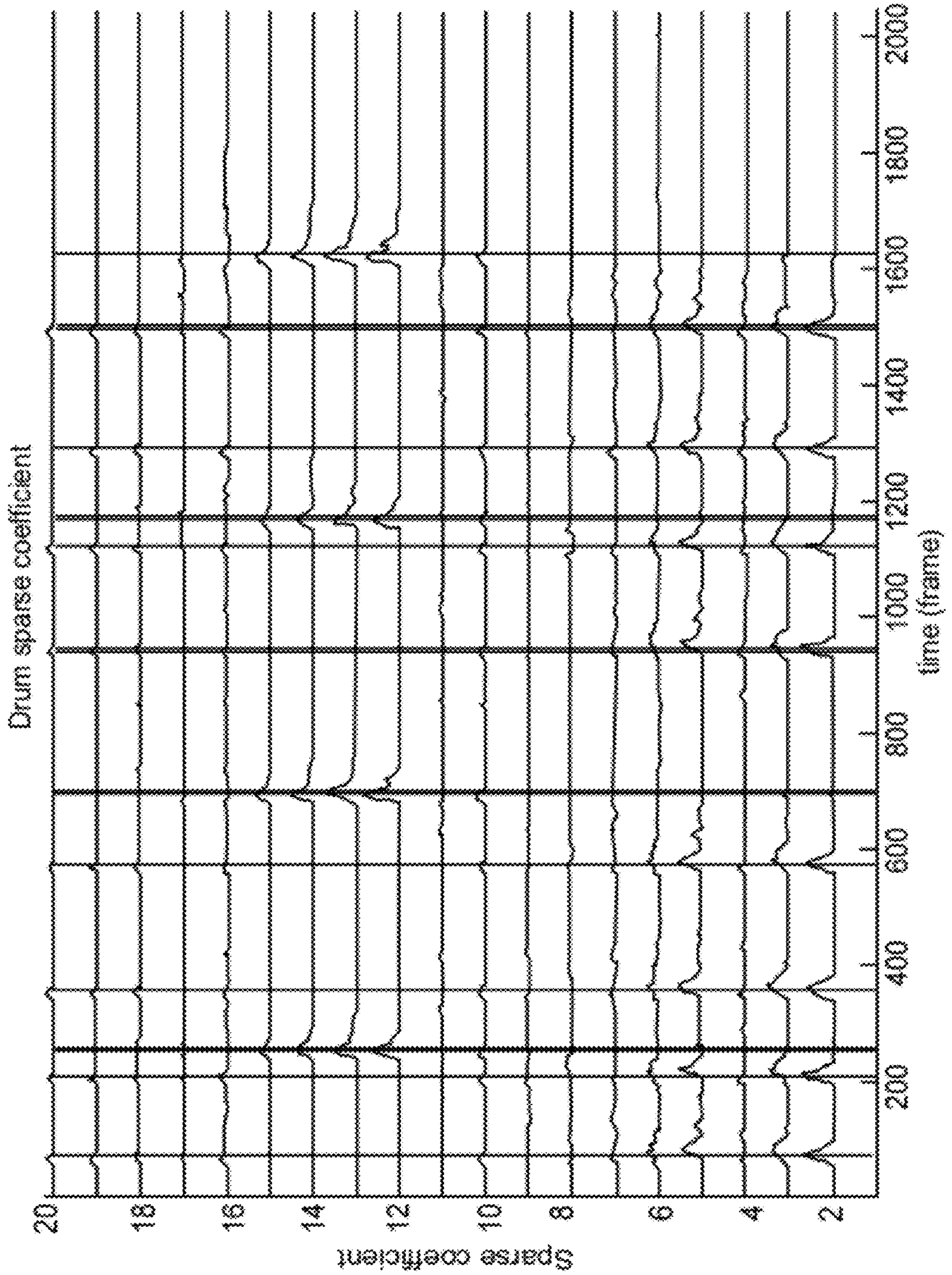

FIGS. 26-30 demonstrate results of applying onset-detection-based post-processing to composite signal example 2 (a piano and flute in playing the same octave with percussion). In these figures, the vertical axis is sparse coefficient index, the horizontal axis is time in frames, and the vertical lines indicate frames at which onset detection is indicated. FIGS. 26 and 27 show piano sparse coefficients before and after post-processing, respectively. FIGS. 28 and 29 show flute sparse coefficients before and after post-processing, respectively. FIG. 30 shows drum sparse coefficients.

FIG. 31 shows results of evaluating the performance of a method as shown in FIG. 32 as applied to a piano-flute test case, using evaluation metrics described by Vincent et al. (Performance Measurement in Blind Audio Source Separation, IEEE Trans. ASSP, vol. 14, no. 4, July 2006, pp. 1462-1469). The signal-to-interference ratio (SIR) is a measure of the suppression of the unwanted source and is defined as $10 \log_{10}(\|s_{target}\|^2/\|e_{interf}\|^2)$. The signal-to-artifact ratio (SAR) is a measure of artifacts (such as musical noise) that have been introduced by the separation process and is defined as $10 \log_{10}(\|s_{target}+e_{interf}\|^2/\|e_{artif}\|^2)$. The signal-to-distortion ratio (SDR) is an overall measure of performance, as it accounts for both of the above criteria, and is defined as $10 \log_{10}(\|s_{target}\|^2/\|e_{interf}\|^2)$. This quantitative evaluation shows robust source separation with acceptable level of artifact generation.

An EM algorithm may be used to generate an initial basis function matrix and/or to update the basis function matrix (e.g., based on the activation coefficient vectors). An example of update rules for an EM approach is now described. Given a spectrogram $V_{ft}$, we wish to estimate spectral basis vectors P(f|z) and weight vectors $P_t(z)$ for each time frame. These distributions give us a matrix decomposition.

We apply the EM algorithm as follows: First, randomly initialize weight vectors $P_t(z)$ and spectral basis vectors P(f|z). Then iterate between the following steps until convergence: 1) Expectation (E) step—estimate the posterior distribution $P_t(z|f)$, given the spectral basis vectors P(f|z) and the weight vectors $P_t(z)$. This estimation may be expressed as follows:

$$P_t(z \mid f) = \frac{P_t(f \mid z)P(z)}{\sum_z P_t(f \mid z)P(z)}.$$

Maximization (M) step—estimate the weight vectors $P_t(z)$ and the spectral basis vectors P(f|z), given the posterior distribution $P_t(z|f)$. Estimation of the weight vectors may be expressed as follows:

$$P_t(z) = \frac{\sum_f V_{ft} P_t(z \mid f)}{\sum_z \sum_f V_{ft} P_t(z \mid f)}.$$

Estimation of the spectral basis vector may be expressed as follows:

$$P(f \mid z) = \frac{\sum_f V_{ft} P_t(z \mid f)}{\sum_t \sum_f V_{ft} P_t(z \mid f)}.$$

During the operation of a multi-microphone audio sensing device, array R100 produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

Figure 40A:
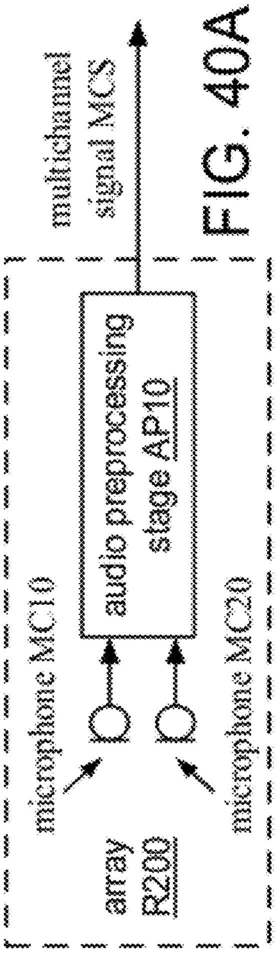
FIG. 40A shows a block diagram of an implementation R200 of array R100.

It may be desirable for array R100 to perform one or more processing operations on the signals produced by the microphones to produce the multichannel signal MCS that is processed by apparatus A100. FIG. 40A shows a block diagram of an implementation R200 of array R100 that includes an audio preprocessing stage AP10 configured to perform one or more such operations, which may include (without limitation) impedance matching, analog-to-digital conversion, gain control, and/or filtering in the analog and/or digital domains.

Figure 40B:
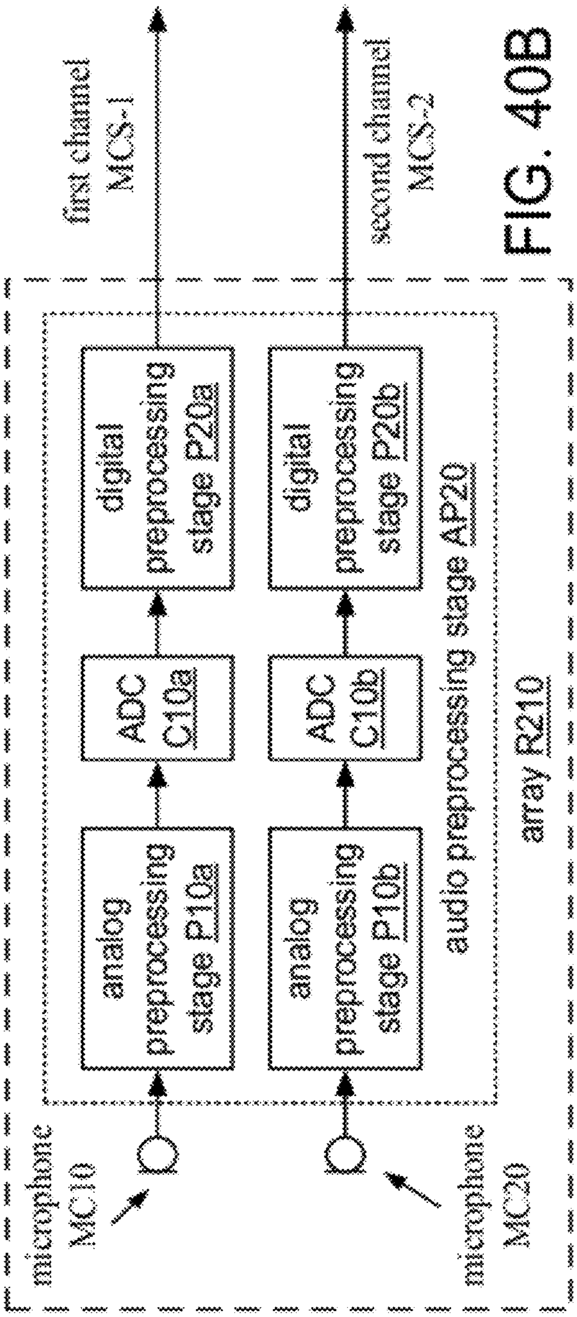
FIG. 40B shows a block diagram of an implementation R210 of array R200.

FIG. 40B shows a block diagram of an implementation R210 of array R200. Array R210 includes an implementation AP20 of audio preprocessing stage AP10 that includes analog preprocessing stages P10*a* and P10*b*. In one example, stages P10*a* and P10*b* are each configured to perform a highpass filtering operation (e.g., with a cutoff frequency of 50, 100, or 200 Hz) on the corresponding microphone signal.

It may be desirable for array R100 to produce the multichannel signal as a digital signal, that is to say, as a sequence of samples. Array R210, for example, includes analog-to-digital converters (ADCs) C10*a* and C10*b* that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44.1, 48, and 192 kHz may also be used. In this particular example, array R210 also includes digital preprocessing stages P20*a* and P20*b* that are each configured to perform one or more preprocessing operations (e.g., echo cancellation, noise reduction, and/or spectral shaping) on the corresponding digitized channel to produce the corresponding channels MCS-1, MCS-2 of multichannel signal MCS. Additionally or in the alternative, digital preprocessing stages P20*a* and P20*b* may be implemented to perform a frequency transform (e.g., an FFT or MDCT operation) on the corresponding digitized channel to produce the corresponding channels MCS10-1, MCS10-2 of multichannel signal MCS10 in the corresponding frequency domain. Although FIGS. 40A and 40B show two-channel implementations, it will be understood that the same principles may be extended to an arbitrary number of microphones and corresponding channels of multichannel signal MCS10 (e.g., a three-, four-, or five-channel implementation of array R100 as described herein).

Each microphone of array R100 may have a response that is omnidirectional, bidirectional, or unidirectional (e.g., cardioid). The various types of microphones that may be used in array R100 include (without limitation) piezoelectric microphones, dynamic microphones, and electret microphones. In a device for portable voice communications, such as a handset or headset, the center-to-center spacing between adjacent microphones of array R100 is typically in the range of from about 1.5 cm to about 4.5 cm, although a larger spacing (e.g., up to 10 or 15 cm) is also possible in a device such as a handset or smartphone, and even larger spacings (e.g., up to 20, 25 or 30 cm or more) are possible in a device such as a tablet computer. For a far-field application, the center-to-center spacing between adjacent microphones of array R100 is typically in the range of from about four to ten centimeters, although a larger spacing between at least some of the adjacent microphone pairs (e.g., up to 20, 30, or 40 centimeters or more) is also possible in a device such as a flat-panel television display. The microphones of array R100 may be arranged along a line (with uniform or non-uniform microphone spacing) or, alternatively, such that their centers lie at the vertices of a two-dimensional (e.g., triangular) or three-dimensional shape.

It is expressly noted that the microphones may be implemented more generally as transducers sensitive to radiations or emissions other than sound. In one such example, the microphone pair is implemented as a pair of ultrasonic transducers (e.g., transducers sensitive to acoustic frequencies greater than fifteen, twenty, twenty-five, thirty, forty, or fifty kilohertz or more).

It may be desirable to perform a method as described herein within a portable audio sensing device that has an array R100 of two or more microphones configured to receive acoustic signals. Examples of a portable audio sensing device that may be implemented to include such an array and may be used for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, tablet computer, or other portable computing device. The class of portable computing devices currently includes devices having names such as laptop computers, notebook computers, netbook computers, ultra-portable computers, tablet computers, mobile Internet devices, smartbooks, and smartphones. Such a device may have a top panel that includes a display screen and a bottom panel that may include a keyboard, wherein the two panels may be connected in a clamshell or other hinged relationship. Such a device may be similarly implemented as a tablet computer that includes a touchscreen display on a top surface. Other examples of audio sensing devices that may be constructed to perform such a method and to include instances of array R100 and may be used for audio recording and/or voice communications applications include television displays, set-top boxes, and audio- and/or video-conferencing devices.

Figure 41A:
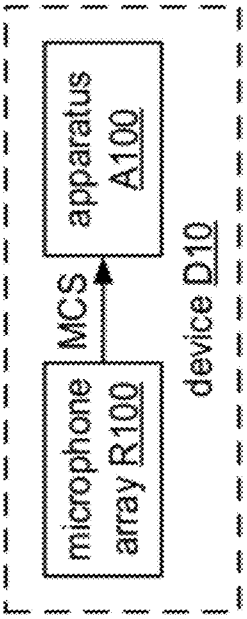
FIG. 41A shows a block diagram of a multimicrophone audio sensing device D10.

FIG. 41A shows a block diagram of a multimicrophone audio sensing device D10 according to a general configuration. Device D10 includes an instance of any of the implementations of microphone array R100 disclosed herein and an instance of any of the implementations of apparatus A100 (or MF100) disclosed herein, and any of the audio sensing devices disclosed herein may be implemented as an instance of device D10. Device D10 also includes an apparatus A100 that is configured to process the multichannel audio signal MCS by performing an implementation of a method as disclosed herein. Apparatus A100 may be implemented as a combination of hardware (e.g., a processor) with software and/or with firmware.

Figure 41B:
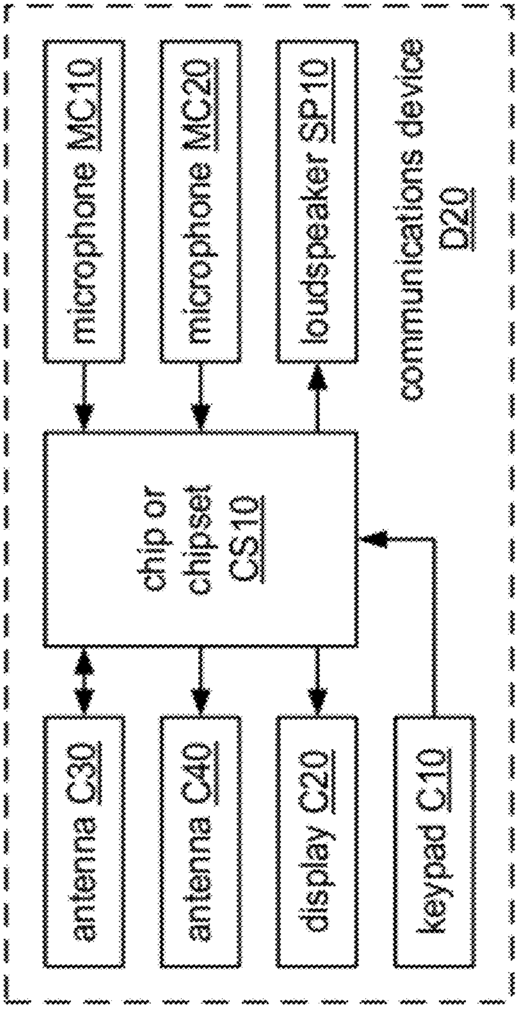
FIG. 41B shows a block diagram of a communications device D20.

FIG. 41B shows a block diagram of a communications device D20 that is an implementation of device D10. Device D20 includes a chip or chipset CS10 (e.g., a mobile station modem (MSM) chipset) that includes an implementation of apparatus A100 (or MF100) as described herein. Chip/chipset CS10 may include one or more processors, which may be configured to execute all or part of the operations of apparatus A100 or MF100 (e.g., as instructions). Chip/chipset CS10 may also include processing elements of array R100 (e.g., elements of audio preprocessing stage AP10 as described below).

Chip/chipset CS10 includes a receiver which is configured to receive a radio-frequency (RF) communications signal (e.g., via antenna C40) and to decode and reproduce (e.g., via loudspeaker SP10) an audio signal encoded within the RF signal. Chip/chipset CS10 also includes a transmitter which is configured to encode an audio signal that is based on an output signal produced by apparatus A100 and to transmit an RF communications signal (e.g., via antenna C40) that describes the encoded audio signal. For example, one or more processors of chip/chipset CS10 may be configured to perform a noise reduction operation as described above on one or more channels of the multichannel signal such that the encoded audio signal is based on the noise-reduced signal. In this example, device D20 also includes a keypad C10 and display C20 to support user control and interaction.

Figure 42:
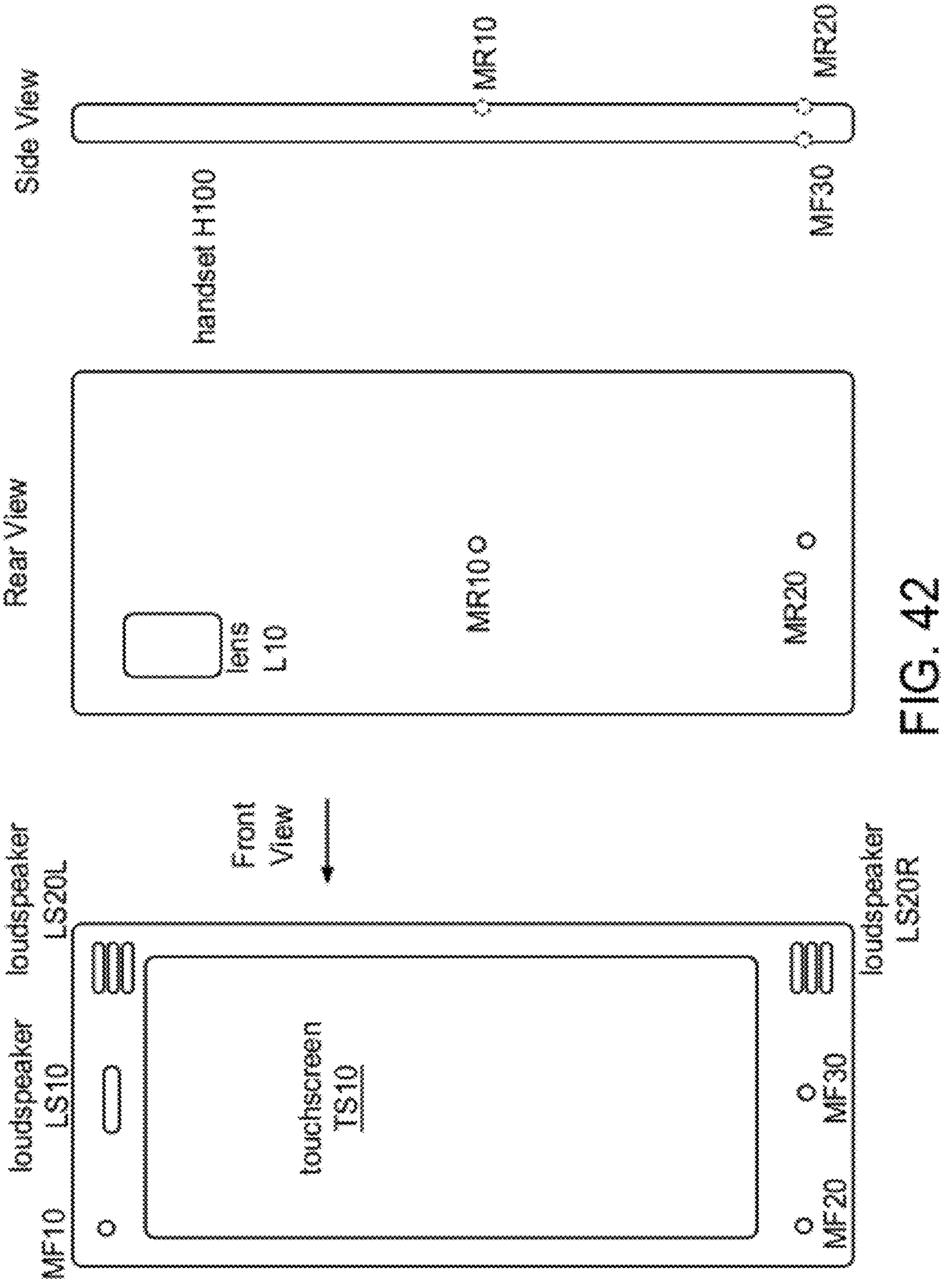
FIG. 42 shows front, rear, and side views of a handset H100.

FIG. 42 shows front, rear, and side views of a handset H100 (e.g., a smartphone) that may be implemented as an instance of device D20. Handset H100 includes three microphones MF10, MF20, and MF30 arranged on the front face; and two microphones MR10 and MR20 and a camera lens L10 arranged on the rear face. A loudspeaker LS10 is arranged in the top center of the front face near microphone MF10, and two other loudspeakers LS20L, LS20R are also provided (e.g., for speakerphone applications). A maximum distance between the microphones of such a handset is typically about ten or twelve centimeters. It is expressly disclosed that applicability of systems, methods, and apparatus disclosed herein is not limited to the particular examples noted herein.

The methods and apparatus disclosed herein may be applied generally in any transceiving and/or audio sensing application, including mobile or otherwise portable instances of such applications and/or sensing of signal components from far-field sources. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing for more aggressive noise reduction.

An apparatus as disclosed herein (e.g., apparatus A100 and MF100) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of the elements of the apparatus may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a music decomposition procedure as described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general-purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into nonvolatile storage or a software program loaded from or into a data storage medium as machine-readable code, such code being instructions executable by an array of logic elements such as a general purpose processor or other digital signal processing unit. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., method M100 and other methods disclosed by way of description of the operation of the various apparatus described herein) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein (e.g., apparatus A100 or MF100) may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of analyzing a multichannel audio signal, said method comprising:

for each of a plurality of frequency components of a segment in time of the multichannel audio signal, calculating a corresponding indication of a direction of arrival;

based on the calculated direction indications, selecting a subset of the plurality of frequency components;

based on the selected subset and on a plurality of basis functions for decomposing the audio signal, calculating a vector of activation coefficients, wherein each activation coefficient of the vector corresponds to a different basis function of the plurality of basis functions; and reconstructing at least a selected portion of the audio signal based on the vector of activation coefficients.

2. A method according to claim 1, wherein each of the plurality of basis functions comprises (A) a first corresponding signal representation over a range of frequencies and (B) a second corresponding signal representation over the range of frequencies that is delayed with respect to said first corresponding signal representation.

3. A method according to claim 1, wherein said selecting a subset is based on a relation, for each of the plurality of frequency components, between the corresponding direction indication and a specified direction.

4. A method according to claim 1, wherein said method comprises, based on at least one of said activation coefficients, subtracting energy from each of a second subset of frequency components of the segment to produce a residual signal, wherein the second subset of frequency components is different than the selected subset of frequency components.

5. A method according to claim 4, wherein said second subset of frequency components is determined by at least one basis function that is indicated by the vector of activation coefficients.

6. The method according to claim 1, wherein said calculating the vector of activation coefficients comprises minimizing an L1 norm of the vector of activation coefficients.

7. A method according to claim 1, wherein at least fifty percent of the activation coefficients of the vector are zero-valued.

8. A method according to claim 1, wherein, for each of the plurality of frequency components, said calculating the corresponding indication of a direction of arrival is based on at least one among a phase difference and a gain difference between corresponding channels of the segment.

9. A method according to claim 1, wherein the frequency components of said selected subset and the second subset are harmonically related.

10. A method according to claim 1, wherein said method comprises, based on information from the calculated vector, producing a residual signal by subtracting at least one among the plurality of basis functions from at least one channel of the multichannel audio signal.

11. A method according to claim 1, wherein each of said plurality of basis functions describes a timbre of a corresponding musical instrument over a range of frequencies.

12. An apparatus for analyzing an audio signal, said apparatus comprising:

means for calculating, for each of a plurality of frequency components of a segment in time of the multichannel audio signal, a corresponding indication of a direction of arrival;

means for selecting a subset of the plurality of frequency components based on the calculated direction indications;

means for calculating a vector of activation coefficients based on the selected subset and on a plurality of basis functions for decomposing the audio signal, wherein each activation coefficient of the vector corresponds to a different basis function of the plurality of basis functions; and means for reconstructing at least a selected portion of the audio signal based on the vector of activation coefficients.

13. An apparatus according to claim 12, wherein each of the plurality of basis functions comprises (A) a first corresponding signal representation over a range of frequencies and (B) a second corresponding signal representation over the range of frequencies that is delayed with respect to said first corresponding signal representation.

14. An apparatus according to claim 12, wherein said selecting a subset is based on a relation, for each of the plurality of frequency components, between the corresponding direction indication and a specified direction.

15. An apparatus according to claim 12, wherein said apparatus comprises means for subtracting energy from each of a second subset of frequency components of the segment, based on at least one of said activation coefficients, to produce a residual signal, wherein the second subset of frequency components is different than the selected subset of frequency components.

16. An apparatus according to claim 15, wherein said second subset of frequency components is determined by at least one basis function that is indicated by the vector of activation coefficients.

17. An apparatus according to claim 12, wherein said means for calculating the vector of activation coefficients is configured to minimize an L1 norm of the vector of activation coefficients.

18. An apparatus according to claim 12, wherein at least fifty percent of the activation coefficients of the vector are zero-valued.

19. An apparatus according to claim 12, wherein, for each of the plurality of frequency components, said calculating the corresponding indication of a direction of arrival is based on at least one among a phase difference and a gain difference between corresponding channels of the segment.

20. An apparatus according to claim 12, wherein said selected subset and the second subset are harmonically related.

21. An apparatus according to claim 12, wherein said apparatus comprises means for producing a residual signal, based on information from the calculated vector, by subtracting at least one among the plurality of basis functions from at least one channel of the multichannel audio signal.

22. An apparatus according to claim 12, wherein each of said plurality of basis functions describes a timbre of a corresponding musical instrument over a range of frequencies.

23. An apparatus for analyzing an audio signal, said apparatus comprising:

a direction estimator configured to calculate, for each of a plurality of frequency components of a segment in time of the multichannel audio signal, a corresponding indication of a direction of arrival;

a filter configured to select a subset of the plurality of frequency components, based on the calculated direction indications; and a coefficient vector calculator configured to calculate a vector of activation coefficients for reconstructing at least a selected portion of the audio signal, based on the selected subset and on a plurality of basis functions for decomposing the audio signal, wherein each activation coefficient of the vector corresponds to a different basis function of the plurality of basis functions, and wherein at least one of the direction estimator, filter, and coefficient vector calculator is a hardware apparatus.

24. An apparatus according to claim 23, wherein each of the plurality of basis functions comprises (A) a first corresponding signal representation over a range of frequencies and (B) a second corresponding signal representation over the range of frequencies that is delayed with respect to said first corresponding signal representation.

25. An apparatus according to claim 23, wherein said selecting a subset is based on a relation, for each of the plurality of frequency components, between the corresponding direction indication and a specified direction.

26. An apparatus according to claim 23, wherein said apparatus comprises a residual calculator configured to subtract energy from each of a second subset of frequency components of the segment, based on at least one of said activation coefficients, to produce a residual signal, wherein the second subset of frequency components is different than the selected subset of frequency components.

27. An apparatus according to claim 26, wherein said second subset of frequency components is determined by at least one basis function that is indicated by the vector of activation coefficients.

28. An apparatus according to claim 26, wherein said coefficient vector calculator is configured to minimize an L1 norm of the vector of activation coefficients.

29. An apparatus according to claim 23, wherein at least fifty percent of the activation coefficients of the vector are zero-valued.

30. An apparatus according to claim 23, wherein, for each of the plurality of frequency components, said calculating the corresponding indication of a direction of arrival is based on at least one among a phase difference and a gain difference between corresponding channels of the segment.

31. An apparatus according to claim 23, wherein said selected subset and the second subset are harmonically related.

32. An apparatus according to claim 23, wherein said apparatus comprises a residual calculator configured to produce a residual signal, based on information from the calculated vector, by subtracting at least one among the plurality of basis functions from at least one channel of the multichannel audio signal.

33. An apparatus according to claim 23, wherein each of said plurality of basis functions describes a timbre of a corresponding musical instrument over a range of frequencies.

34. A non-transitory machine-readable storage medium comprising tangible features that when read by a machine cause the machine to:

calculate, for each of a plurality of frequency components of a segment in time of the multichannel audio signal, a corresponding indication of a direction of arrival;

select a subset of the plurality of frequency components based on the calculated direction indications;

calculate a vector of activation coefficients based on the selected subset and on a plurality of basis functions for decomposing the audio signal, wherein each activation coefficient of the vector corresponds to a different basis function of the plurality of basis functions; and reconstruct at least a selected portion of the audio signal based on the vector of activation coefficients.

* * * * *